(12) United States Patent
Jacobs

(10) Patent No.: US 6,876,107 B2
(45) Date of Patent: Apr. 5, 2005

(54) CONTROLLED MOTION SYSTEM

(75) Inventor: Keith Jacobs, Loveland, OH (US)

(73) Assignee: Jacobs Automation, Loveland, OH (US)

(*) Notice: Subject to any disclaimer, the term of this patent is extended or adjusted under 35 U.S.C. 154(b) by 0 days.

(21) Appl. No.: 10/454,713

(22) Filed: Jun. 5, 2003

(65) Prior Publication Data

US 2003/0230941 A1 Dec. 18, 2003

Related U.S. Application Data

(60) Provisional application No. 60/386,151, filed on Jun. 5, 2002.

(51) Int. Cl.[7] ............................................. H02K 41/00
(52) U.S. Cl. ........................................ 310/12; 318/135
(58) Field of Search ............................. 310/12, 13, 14; 335/263; 318/135

(56) References Cited

U.S. PATENT DOCUMENTS

| | | | |
|---|---|---|---|
| 3,656,015 A | * 4/1972 | Gillum | 310/13 |
| 3,803,466 A | 4/1974 | Starkey | 318/135 |
| 3,890,421 A | 6/1975 | Habozit | 264/289 |
| 4,427,905 A | * 1/1984 | Sutton | 310/13 |

(Continued)

FOREIGN PATENT DOCUMENTS

| | | |
|---|---|---|
| EP | 1 015 851 B1 | 11/2002 |
| EP | 1 270 311 A2 | 1/2003 |
| EP | 1 270 311 A3 | 1/2003 |
| EP | 1 270 312 A1 | 1/2003 |
| WO | WO 98/50760 | 11/1998 |
| WO | WO 00/64741 | 11/2000 |
| WO | WO 00/64742 | 11/2000 |
| WO | WO 00/64751 | 11/2000 |
| WO | WO 00/64753 | 11/2000 |
| WO | WO 00/64791 | 11/2000 |
| WO | WO 00/75603 | 12/2000 |

Primary Examiner—Thanh Lam
Assistant Examiner—Judson H. Jones

(57) ABSTRACT

A controlled motion system, which has a mover that is movably mounted on a track for moving along a path. Active and reactive elements are associated with the track and mover, and are configured for driving and controlling the mover along the path. A controller is operatively associated with the active elements for controlling the driving of the mover, and a position sensor is associated with the track and configured for sensing the position information corresponding to the position of the mover along the path. The sensor is associated with the controller for transmitting the position information to the controller. The sensors are also preferably configured such that the position information is transmitted from the mover through the sensor at a sensing speed faster than about 10,000 meters per second. The controller is preferably configured for controlling the active element depending on at least one parameter related to the movement of the mover such that at least one mover is controlled independently from the others.

41 Claims, 23 Drawing Sheets

U.S. PATENT DOCUMENTS

| | | | |
|---|---|---|---|
| 4,542,311 A | * 9/1985 | Newman et al. | 310/13 |
| 4,595,870 A | 6/1986 | Chitayat | 318/687 |
| 4,675,582 A | 6/1987 | Hommes et al. | 318/38 |
| 4,698,996 A | 10/1987 | Kreft et al. | 73/1 |
| 4,704,792 A | 11/1987 | Itagaki et al. | 29/741 |
| 4,760,294 A | 7/1988 | Hansen | 310/13 |
| 4,786,891 A | * 11/1988 | Ueda et al. | 341/13 |
| 4,825,111 A | 4/1989 | Hommes et al. | 310/12 |
| 4,853,602 A | 8/1989 | Hommes et al. | 318/38 |
| 4,906,909 A | * 3/1990 | Gremillion et al. | 318/656 |
| 5,023,495 A | 6/1991 | Ohsaka et al. | 310/12 |
| 5,051,225 A | 9/1991 | Hommes et al. | 264/288.4 |
| 5,072,493 A | 12/1991 | Hommes et al. | 26/72 |
| 5,093,590 A | * 3/1992 | Murai et al. | 310/12 |
| 5,225,725 A | 7/1993 | Shiraki et al. | 310/12 |
| 5,237,252 A | 8/1993 | Tanaka et al. | 318/587 |
| 5,282,424 A | * 2/1994 | O'Neill | 104/282 |
| 5,606,256 A | 2/1997 | Takei | 324/207.21 |
| 5,701,042 A | * 12/1997 | Takei | 310/12 |
| 5,810,153 A | * 9/1998 | Zimmerman et al. | 198/495 |
| 5,831,352 A | 11/1998 | Takei | 310/12 |
| 5,907,200 A | 5/1999 | Chitayat | 310/12 |
| 5,925,943 A | 7/1999 | Chitayat | 310/12 |
| 5,936,319 A | 8/1999 | Chitayat | 310/12 |
| 5,942,817 A | 8/1999 | Chitayat | 310/12 |
| 5,965,963 A | 10/1999 | Chitayat | 310/12 |
| 5,977,664 A | 11/1999 | Chitayat | 310/12 |
| 5,994,798 A | 11/1999 | Chitayat | 310/12 |
| 6,011,508 A | 1/2000 | Perreault et al. | 342/350 |
| 6,078,114 A | * 6/2000 | Bessette et al. | 310/12 |
| 6,114,825 A | * 9/2000 | Katz | 318/615 |
| 6,191,507 B1 | 2/2001 | Peltier et al. | 310/12 |
| 6,274,952 B1 | 8/2001 | Chitayat | 310/12 |
| 6,417,584 B1 | 7/2002 | Chitayat | 310/12 |
| 6,455,957 B1 | 9/2002 | Chitayat | 310/12 |
| 2002/0047315 A1 | 4/2002 | Chitayat | 310/12 |
| 2002/0089237 A1 | 7/2002 | Hazelton | 310/12 |
| 2002/0149272 A1 | 10/2002 | Chitayat | 310/12 |
| 2002/0180279 A1 | 12/2002 | Faizullabhoy et al. | 310/12 |
| 2002/0185919 A1 | 12/2002 | Botos et al. | 310/12 |
| 2003/0025403 A1 | 2/2003 | Hsiao | 310/12 |

* cited by examiner

CONTROLLED MOTION SYSTEM

CROSS-REFERENCE TO RELATED APPLICATIONS

This applications claims the benefit of U.S. Provisional Application No. 60/386,151 filed Jun. 5, 2002, the content of which is expressly incorporated herein by reference thereto.

BACKGROUND OF INVENTION

The present invention relates to motion control systems and, more specifically, to linear motor systems that provide independent control of multiple moving elements.

The application of such devices to a wide variety of processes (e.g. packaging, assembly automation, processes involving use of machine tools, etc.) provides the advantage of increasing both the speed and flexibility of the process. Since linear motors employ a moving magnetic field to directly drive the moving element, they eliminate the gear heads, shafts, keys, sprockets, chains and belts often used with traditional rotary motors. This reduction of mechanical complexity provides both reduced cost and increased speed capability by virtue of reduced inertia, compliance, damping, friction and wear. This technology also provides greater flexibility than rotary motors by allowing each individual moving element and its associated tool or payload to be independently servocontrolled along its entire path.

Typical systems use "incremental absolute" position sensors which can determine absolute position only after a mover that moves along the track is jogged past a known reference point. Thereafter, these systems count incremental pulses (or digitize sine/cosine signals to create these pulses) to count up or down from this reference point. If power is lost or the pulse counting is disrupted due to a crash, jam, etc., then these prior art systems have to be re-homed and commutation alignment performed again. This results in lost production time and, oftentimes, lost product.

Traditional linear motors suffer from a variety of limitations. For example, U.S. Pat. No. 5,965,963 discloses a linear motor with a plurality of independently movable elements. Each movable element has a track of switching sensors associated with it to connect proximal armature coils to a power source associated with each movable element. In addition, a separate track of encoder sensors is provided for each movable element to measure its position. This configuration can limit the number of movable elements and the length of the track since the mechanical complexity and electrical reliability of the system becomes impractical with a large number of sensor and switch tracks and elements. Additionally, the position sensing system disclosed is an incremental type, with the limitations described above.

PCT Publication WO 00/75603 discloses a machine that utilizes two or more magnetostrictive sensors disposed along a path for position sensing. The sensors are linked into a single "virtual" sensor by a digital signal processor, which outputs a position signal that can be read by a motion controller. The magnetostrictive sensors measure position by timing acoustic waves along a wave guide. The typical acoustic speed for these sensors is 2800 m/s, which is very slow compared to the speed of an electron or photon. For example, a typical system might require a resolution 0.1 mm at a speed of 1000 mm/s for a path that is 3 meters long. A large number of magnetostrictive sensors are needed, which have been prohibitively expensive.

U.S. Pat. No. 6,191,507 discloses a modular conveyor system comprised of interconnected track sections. Each section has a plurality of individually controlled coils that provide independent control of multiple pallets that travel along the track. This system employs a plurality of linear encoder readers spaced at fixed positions along the track and linear encoder strips mounted on the pallet to sense the position of each pallet. Each section has a controller for trajectory generation, position compensation and current control.

The position sensing system disclosed, however, is an incremental absolute type. Since it uses incremental encoders, it can provide an absolute position signal only after performing a homing and commutation alignment procedure for each movable element at power up. This requires moving each element a certain distance to find the zero reference position and the magnetic pole positions. After abnormal events e.g. crashes, jams, etc. incremental position pulses are often lost and the system must be re-homed. Additionally, this system utilizes a series of encoders that overlap to maintain the absolute position reading of each pallet. This overlap design requires additional complexity to hand-off the control from reader to reader.

Third, the permanent-magnet attractive force is not balanced resulting in reduced bearing life as compared to a design with a balanced magnet load.

SUMMARY OF THE INVENTION

The present invention relates to a controlled motion system, which can be employed in a manufacturing or other type of machine to control the movement and operation of a tool, payload, or other items that need to be moved to effect a process. A preferred embodiment of the system includes a track and a mover that is mounted movably on the track for moving along a path. Active and reactive elements are associated with the track and mover and configured for driving and controlling the position of the mover along the path. A controller is operably associated with the active elements for controlling the driving of the mover. A position sensor is associated with the track and configured for sensing the position information, which corresponds to the position of the mover along the path. The position information is preferably true absolute position information and is preferably transmitted from the mover through the sensor substantially at a sensing speed faster than about 10,000 meters per second, and more preferably faster than about 25,000 meters per second. The information is preferably transmitted substantially along the path at at least this speed. The sensor is associated with a controller for transmitting the position information thereto, and the controller is preferably configured for controlling the active element depending on at least one parameter related to the movement of the mover. Preferably, the sensing speed at which the information is transmitted from the mover to the sensor is about the speed of electrons, and the sensor preferably comprises an array of magnetoresistive sensor elements, and in one embodiment, is configured for detecting a relative angle to the mover.

The sensor can comprise a transducer configured for transducing the position information from the movers from a first form to a second form that is readable by the controller. Preferably, the position information is transmitted in the first form at at least the sensing speed from the movers to the transducer, and in the second form to the controller. Additionally, the position information in the first form can include electromagnetic waves, and in the second form can include an electric or electronic connection. The preferred movers have a sensor activation element that transmits the position information to the sensor, and the activation element is free of a power source, and from wires or other physical connection.

Preferably, a plurality of movers is provided. The controller is preferably configured for controlling the movement of at least one of the movers independently from the others, and most preferably, each mover is controlled independently from all of the others. The active elements preferably comprise a plurality of active elements, and the reactive elements are mounted to the mover. Additionally, the controller can be configured for activating the active elements that are in operational proximity to the reactive elements for independently controlling at least one of the movers. The preferred sensor includes a plurality of sensors disposed along the path, and a linear motor preferably comprises the active and reactive elements. In a preferred embodiment of a machine according to the invention, the inventive system includes a tool mounted on the mover and configured for performing an operation on a work piece, such as a manufacturing operation or other operation.

In one embodiment of the system, one or more position sensors are provided, which are positioned along the path in a non-overlapping association, such that a reference point on the mover is disposed adjacent to only one of the sensors at a time, preferably measured in a direction normal to the track. Additionally, in a preferred embodiment, the controller is configured for calculating parameters corresponding to the position and motion of the mover using a seventh order polynomial, which is preferably recalculated upon occurrences of an abnormal event that disrupts the movement of the mover or an event that requires adjustment to the mover movement, as opposed to applying a table shifting scheme, which can be used with other features of the invention.

One embodiment of the system has a track bearing portion associated with a mover bearing portion of a mover to guide the mover along the path. A driving element, which may include or be the active elements, is configured for driving and controlling the position of the mover along the path. The controller is operably associated with the driving element for controlling the driving of the mover, and a position sensor is configured for sensing the position of the mover along the path and transmitting position information related thereto to the controller. The track bearing portion and driving element are assembled together on a single track that extends along at least a portion of the path, and more preferably along substantially the entire path. The position sensor can be mounted to the single track, and the track can comprise a plurality of interconnected track modules. A preferred mover defines an interior passage in which the single track is received longitudinally with respect to the path, with the single track being substantially free of additional track portions that extend parallel to the bearing portions and are spaced therefrom in a lateral direction with respect to the path. Thus, the mover can effectively straddle the track in the interior portion. Additionally, to maintain sanitary conditions of the track, the single track is preferably configured for draining fluid material therefrom.

The bearing portions can be configured for keeping the mover on the track in at least two orientations in which a line normal to the path is oriented at 180° to the same line in the other orientation. Preferably, the bearing portions are configured to allow operation of the mover in substantially any orientation, including upside down. The track bearing portion preferably has only two rails extending along the path.

In one embodiment, in which the mover comprises a mover bearing portion, a plurality of track modules are assembled to form the track, and each module preferably comprises the active elements, as well as a track bearing portion associated with the mover bearing portion for guiding the mover along the path. Preferably, the position sensor comprises module position sensors configured for sensing the position of the mover along the path and transmitting the information on the position of the mover to the controller. Each module preferably comprises at least one of the module position sensors. Additionally, the controller preferably comprises a plurality of module controllers associated with the active elements for controlling the activation thereof and the driving of the mover, and the module sensors are preferably configured for transmitting the position information to the module controllers. Each module preferably additionally comprises one of the module controllers. A system controller is preferably operably associated with the module controllers for controlling the operation thereof.

In an embodiment of the invention intended for use in a sanitary environment, the track is preferably configured for draining flowable material therefrom to maintain the sanitary conditions. A cover can be disposed on the track and configured for enclosing elements such as the active elements to prevent the collection of the flowable material. The track and portions of the system mounted thereto are preferably substantially free of any upwardly facing concave portions with closed lower surfaces that would otherwise trap the flowable material, such that the flowable material is drained from any upwardly facing portions. Any upwardly facing concave portion on the track can include drain channels for draining the flowable material therefrom.

Preferably, the mover is also configured for draining flowable material therefrom for maintaining sanitary conditions. The track and portions of the system mounted thereto are preferably substantially free of any concave portions with a closed side in which flowable material tends to collect, such that the flowable material is drained from any concave portions. Any concave portions in which the flowable material tends to collect preferably have a drain feature.

For the controlling of the position and movement of the movers, the controller can be configured for assigning a soft identifier to at least one of the movers that is reassignable to others, such as whenever the operation of the system is stopped. Preferably, the soft identifier is assigned to at least one of the movers, depending on the position thereof at a selected time.

BRIEF DESCRIPTION OF THE DRAWINGS

The foregoing and other aspects of the invention are discussed in greater detail below with reference to the drawings, provided for the purpose of description and not limitation, where like objects are referenced by like reference numbers, and wherein.

DETAILED DESCRIPTION OF THE PREFERRED EMBODIMENTS

Figure 1:
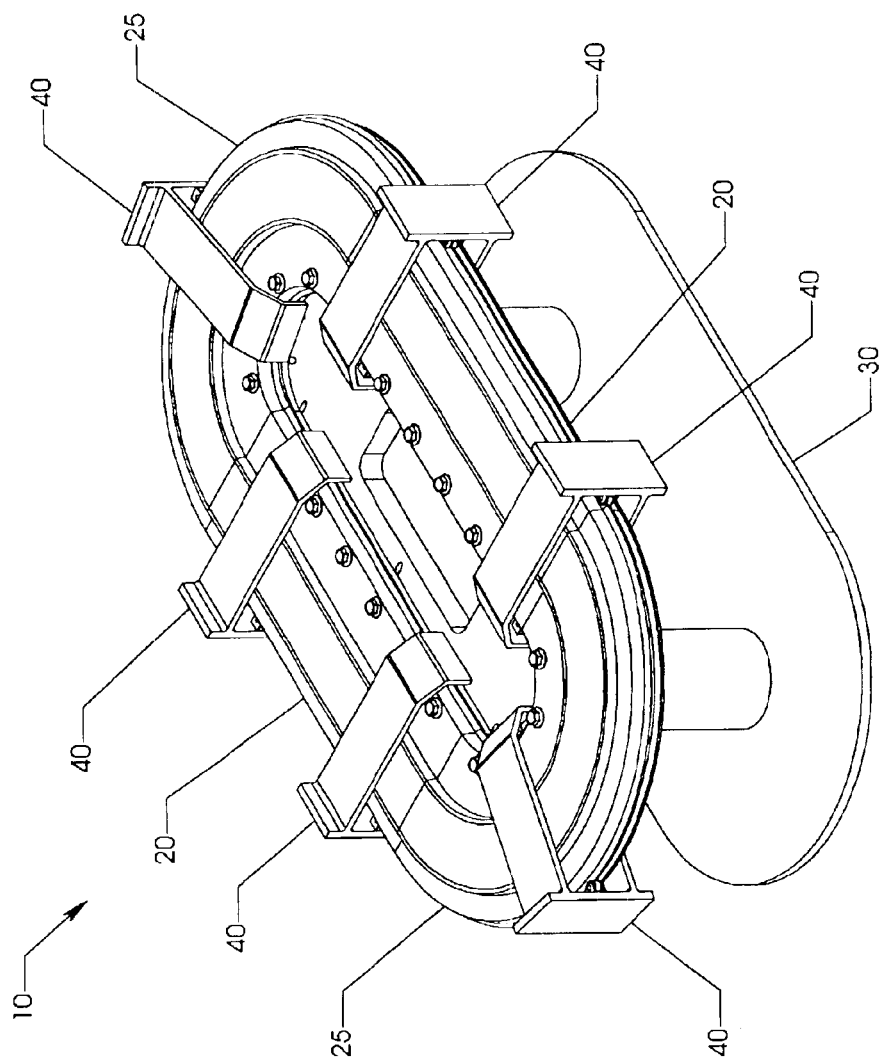
FIG. 1 is a perspective view of a racetrack embodiment constructed according to the invention of linear motor modules and with multiple moving elements that are independently controlled.

In the embodiment of FIG. 1, a closed-path track assembly has a track 10 and at least one moving element, which is preferably a mover 40, mounted on linear-motor stator modules, which preferably include two straight linear motor stator modules 20 and two constant-radius curved linear motor stator modules 25. Each mover 40 is preferably movable independent of all of the other movers 40. All four linear motor modules 20, 25 are mounted to a common frame 30. In the preferred embodiment, track 10 and movers 40 cooperatively function as a motion control system for independently controlling the motion of each mover 40 along the path.

Figure 2:
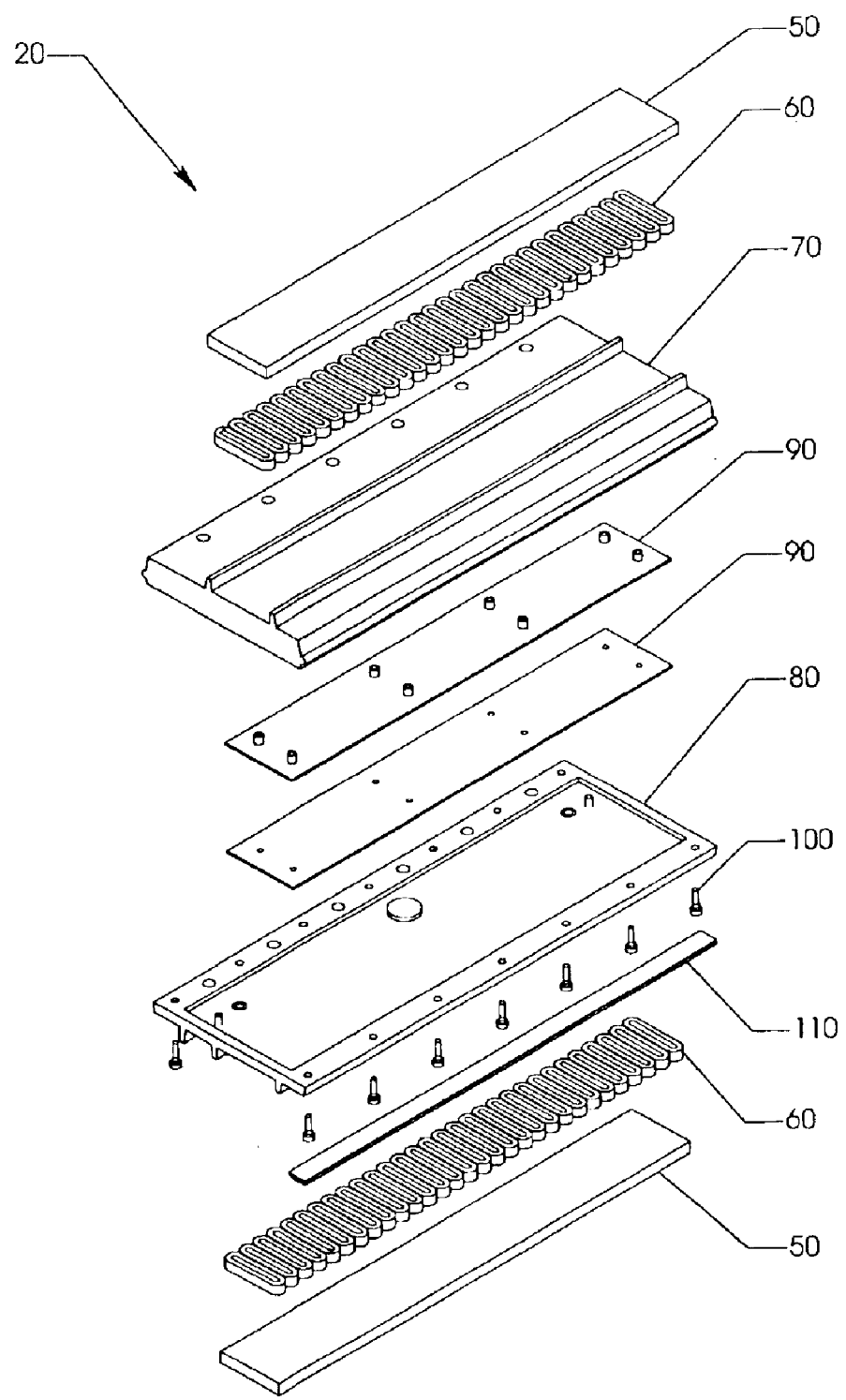
FIG. 2 is an exploded view of a straight linear motor stator module thereof.
Figure 3:
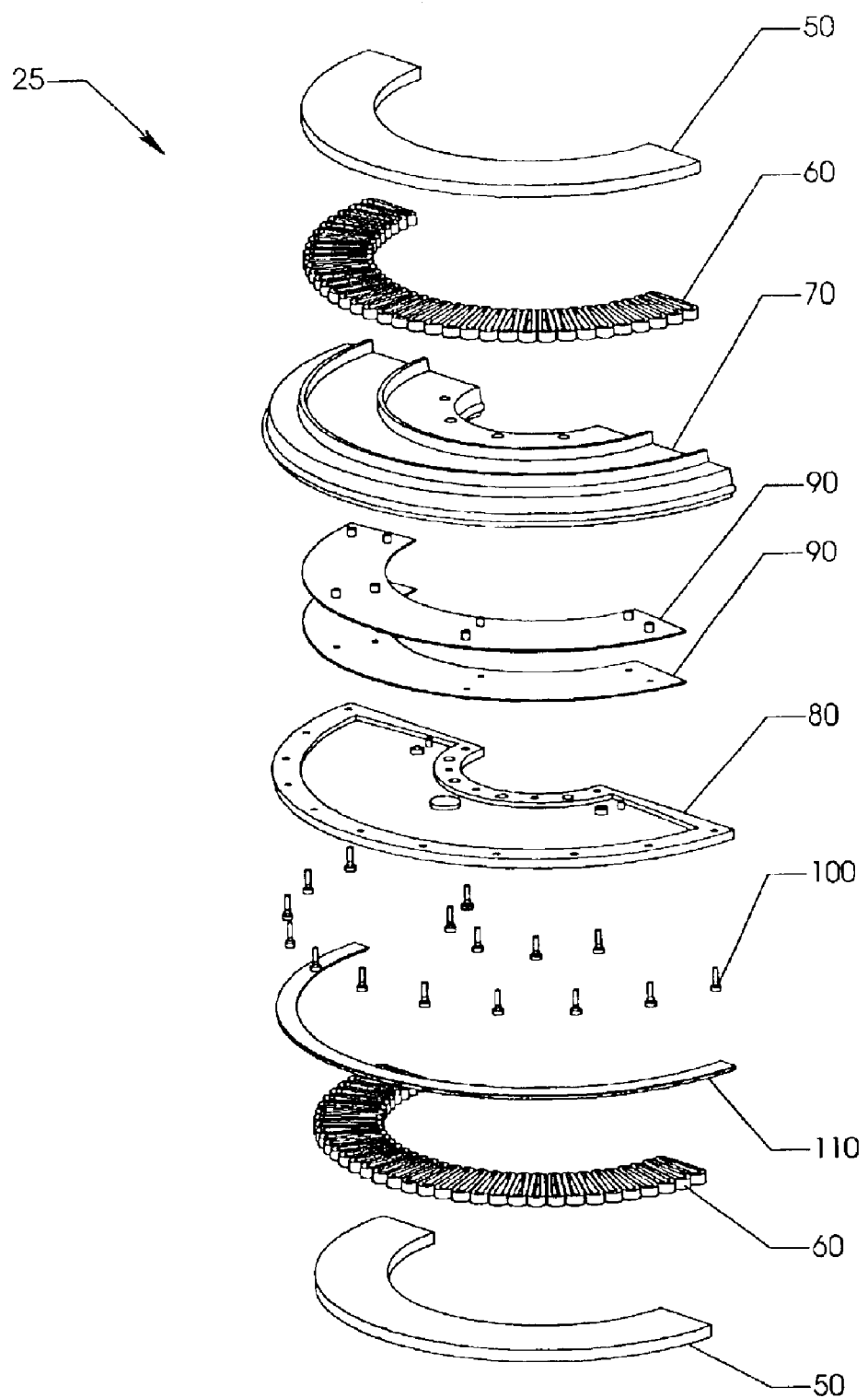
FIG. 3 is an exploded view of a constant-radius curved linear motor stator module thereof.

As shown in FIGS. 2 and 3, linear motor modules 20 and 25 include preferably active elements 60 sandwiched between encapsulation 50 and stator top plate 70 or stator bottom plate 80, respectively. Controllers 90 are mounted to the stator plates 70, 80, and fasteners 100, preferably fasten the assembly together, a control parameter sensor 110 is preferably mounted to the stator bottom plate 80. Active element 60 generally includes an electromagnetic armature coil and the control parameter sensor 110 is preferably a true absolute position sensor capable of determining the true absolute position of the movers 40.

While module 20 is substantially straight, module 25 has a constant-radius of curvature. While the components of the straight linear motor module 20 are substantially straight, the elements of the curved module 25 extend along a curve according to the configuration of the module. In other embodiments, the path shape of the individual modules can have a varying radius to create a curvilinear shape of arbitrary design.

Figure 4:
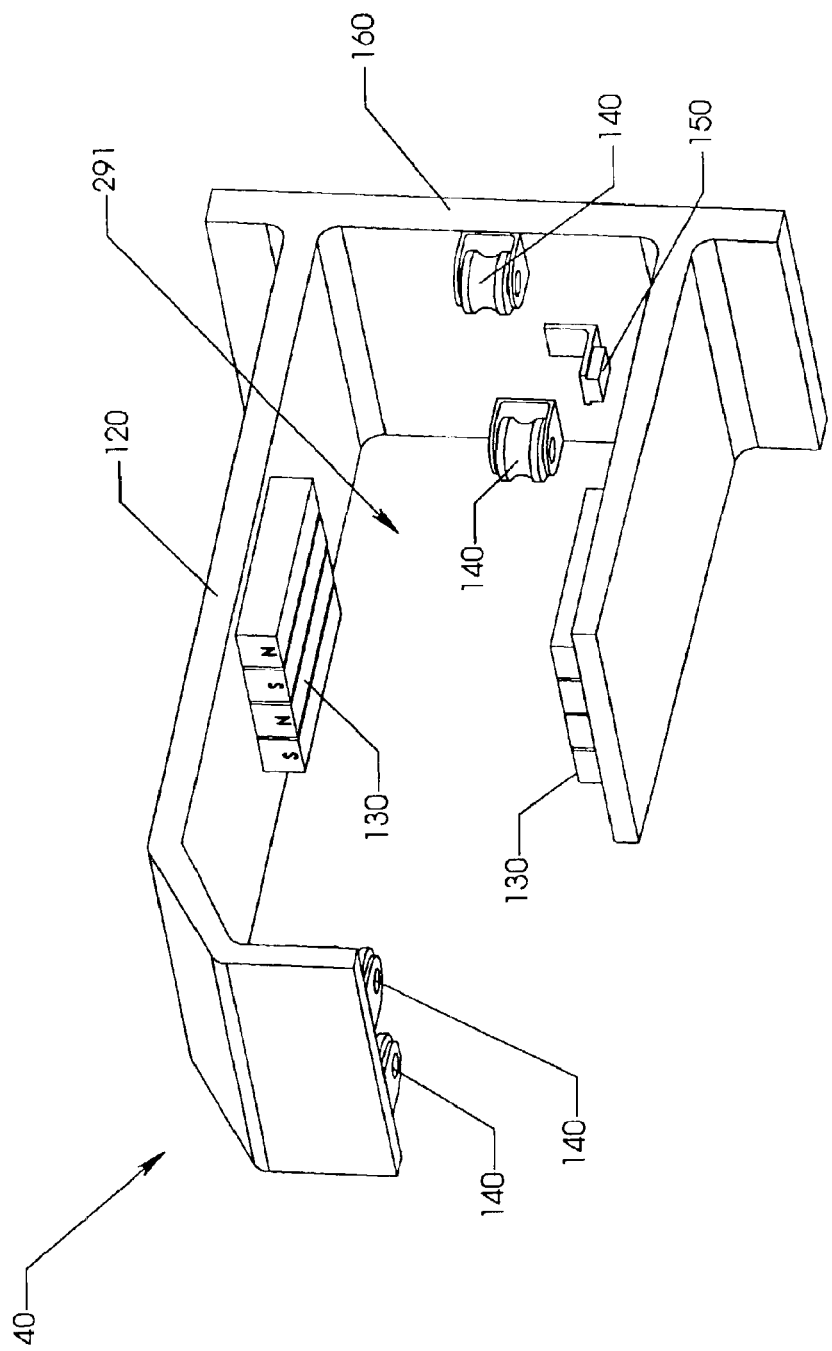
FIG. 4 is a perspective view of a mover module thereof.

Referring to FIG. 4, mover 40 includes a carriage 120, to which are mounted reactive elements 130, roller wheels 140, and a control parameter sensor activation element 150, each preferably disposed in and facing carriage interior passage 291. Preferably, reactive element 130 includes a set of magnets, which are most preferably rare-earth permanent magnets, and the control parameter sensor activation element 150 includes a single permanent magnet. In a preferred embodiment, the mover 40 is configured to traverse the entire path along both the straight and curved modules 20, 25. The active and reactive elements are associated to produce relative movement therebetween when the active elements are energized.

A tool or payload preferably is operatively associated with one or more of the movers to perform a useful process. In one embodiment, the tool or payload is attached to mounting flange 160. In addition, each mover 40 preferably is mechanically independent of all the others, allowing its associated tool or payload to be moved and controlled independently from all the others.

Figure 5:
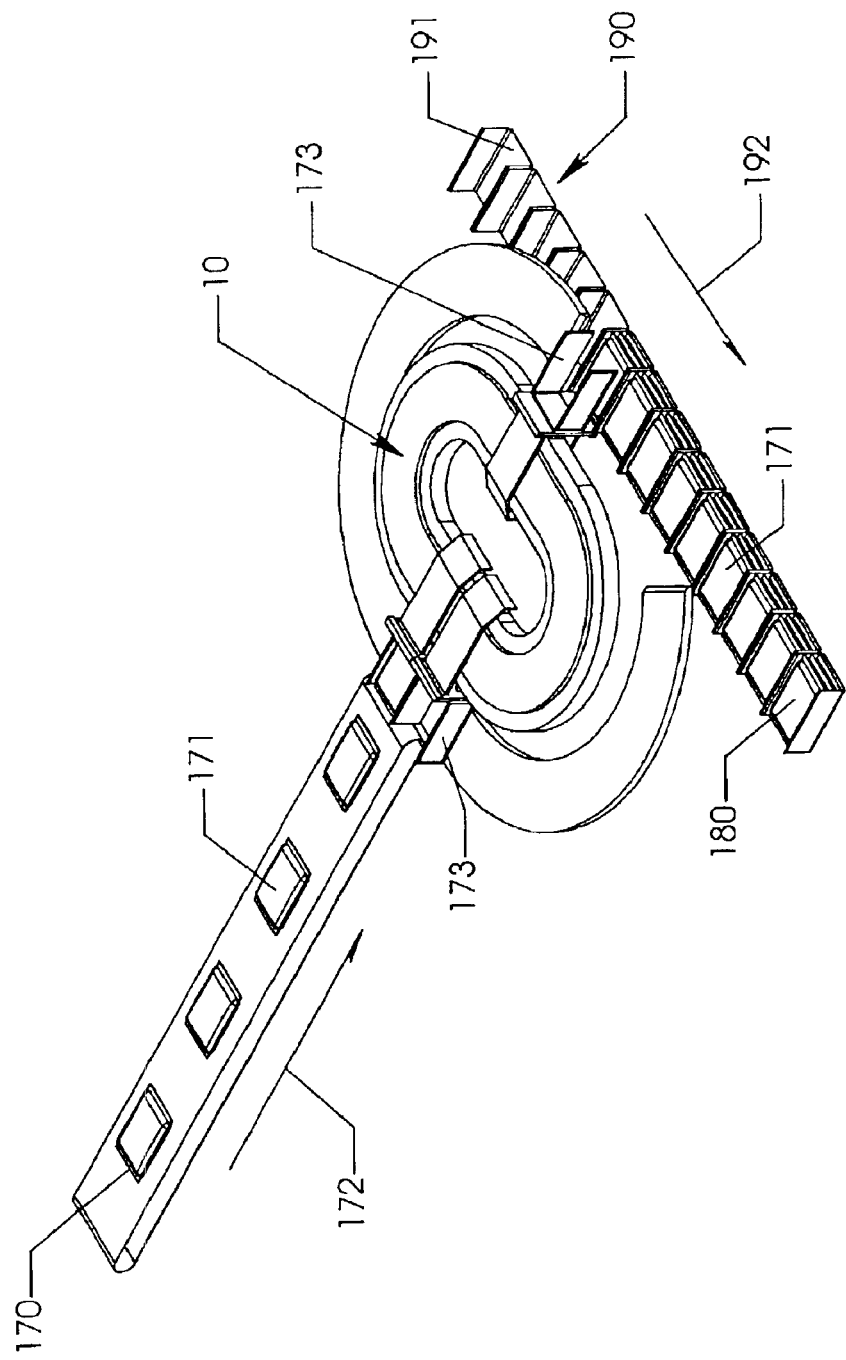
FIG. 5 is a perspective view of a packaging collation machine of an embodiment of the invention.

As illustrated in FIG. 5, track 10 of one embodiment is part of a packaging system and is configured to receive an incoming product stream 170 of products 171, such as packages, moving in direction 172 and arriving asynchronously on one side of the track 10, such as on a conveyor arranged radially, or at another orientation, with respect to the track 10. The system includes tools 173 arranged to receive, move, and output the products 171 as an outgoing product stream 180 on another side of the track 10, such as in synchronization with a product conveyor 190 that receives the products in product receptors 191, such as bags, and moves them in direction 192, which can be tangential or in another direction with respect to the track 10.

Figure 6:
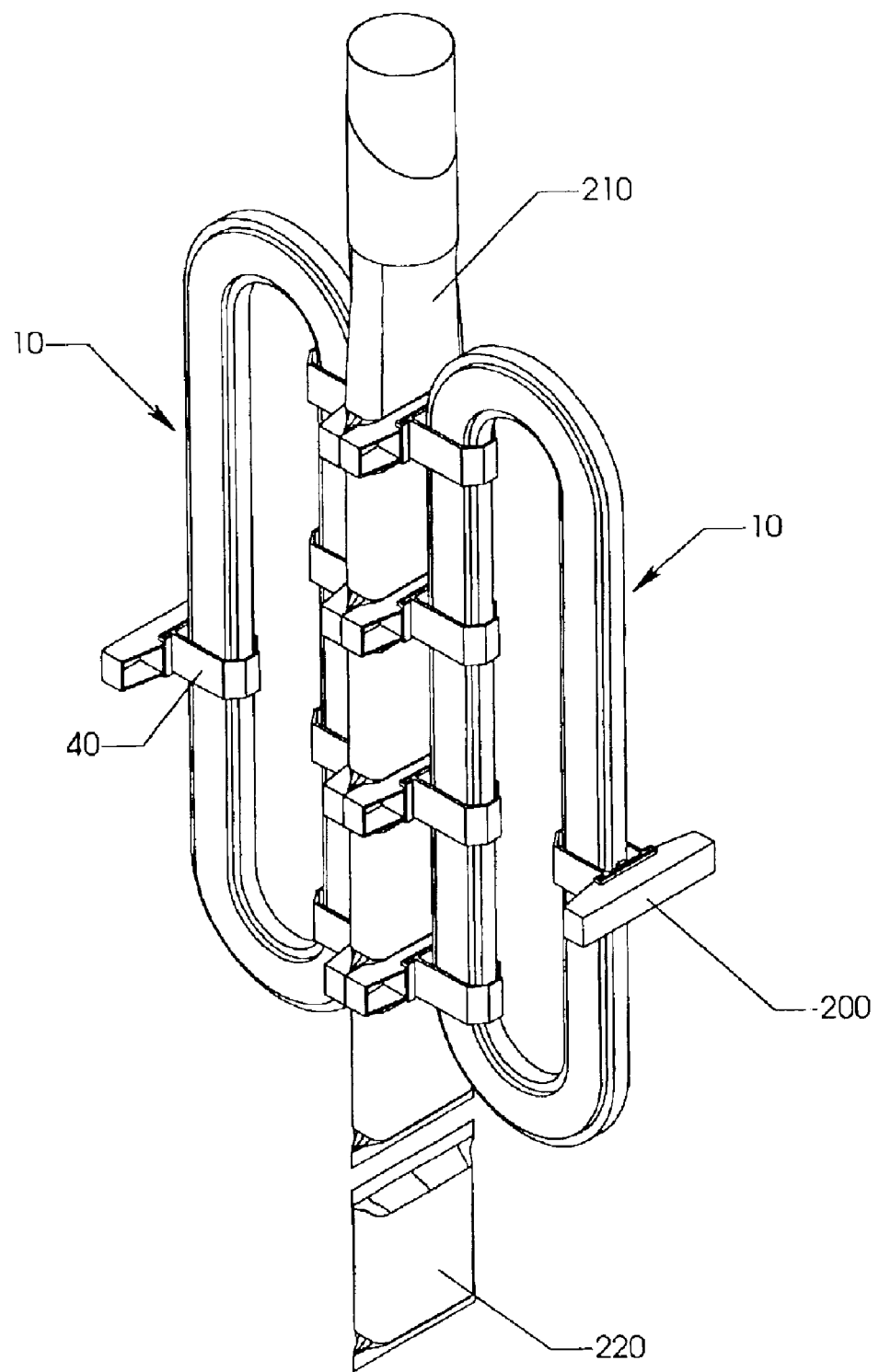
FIG. 6 is a perspective view of a vertically oriented form, fill, and seal machine embodiment of the invention.

Referring to FIG. 6, another embodiment has two tracks 10 with movers 40 driven to cooperatively perform an operation on a common work piece. The embodiment shown is configured for transverse sealing in a vertical form, fill and seal packaging machine. Both the plane and longitudinal axis of the two tracks 10 are oriented generally vertically and are placed opposite one another. Each mover 40 has a seal and cut head mounted thereon to seal and cut a tube 210 of packaging material fed downwardly therethrough to produce individual sealed packages 220 when the heads of the opposing movers 40 cooperate to perform these functions.

Figure 7:
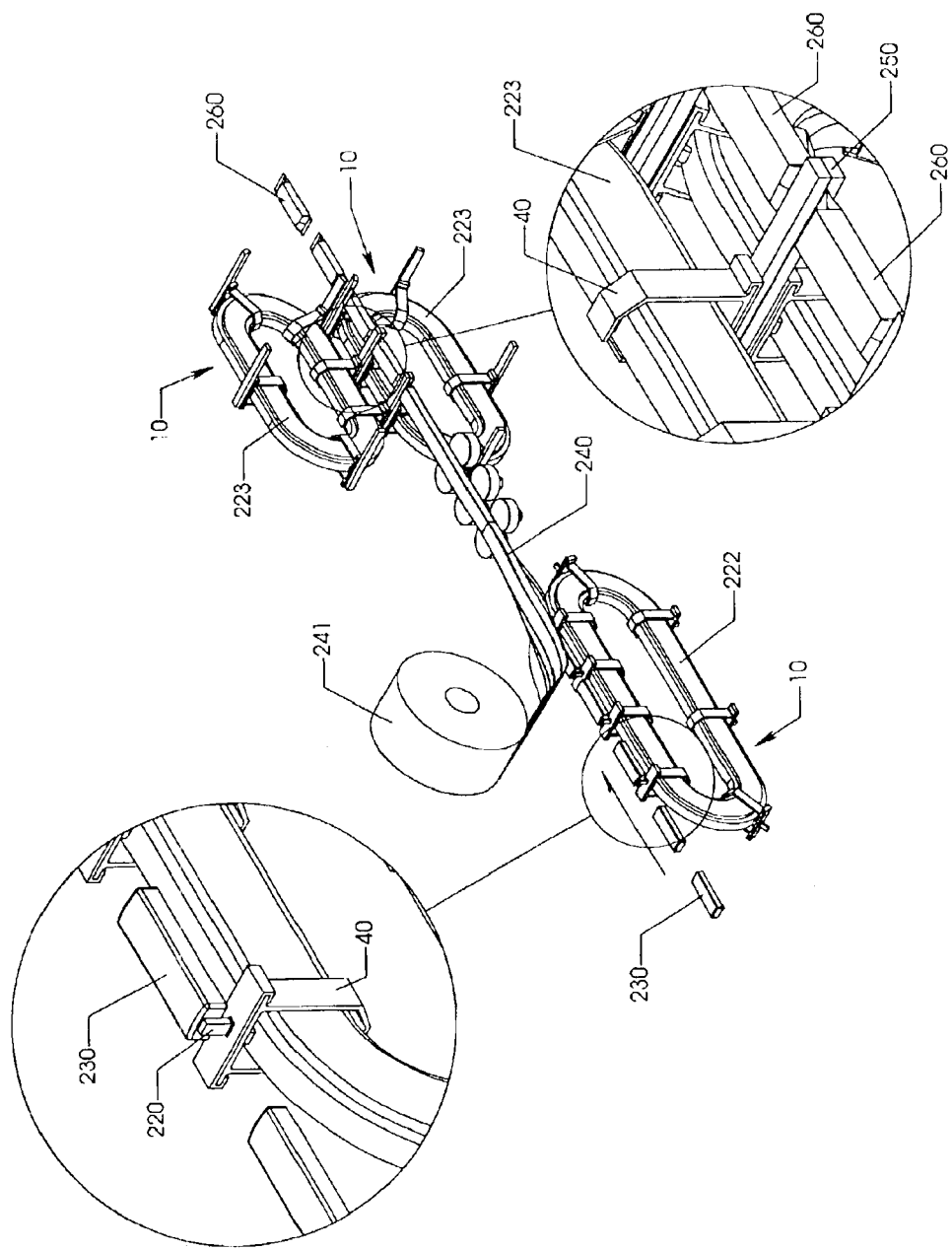
FIG. 7 is a perspective view of a horizontal flow wrapping machine embodiment of the invention.

In the embodiment of FIG. 7, three tracks 10 are employed in a horizontal flow wrapping machine. All three tracks 10 define a path for the movers 40 oriented along a plane that is oriented substantially vertically, and the longitudinal axes of the tracks 10 are oriented generally horizontally. One track 222 has a plurality of movers 40 with product lugs 220 mounted thereon. Each product lug 220 is moved into association with an incoming product 230, and the mover 40 in which it is mounted the lug 220 to position the product 230 at the proper spacing from adjacent products 230. The mover 40 with its lug 220 inserts the product 230 into the packaging material tube 240, which is preferably fed from a web roll 241 which is shown extending in parallel with the product stream and then folded therearound. The remaining two tracks 223 are disposed opposite one another and operate movers 40 and cross seal and cutoff heads 250 mounted thereon to cross seal and cut the packaging material tube 240 to produce individual sealed packages 260.

Tracks 10 can also be used in a variety of other packaging operations, such as a variable-pitch carton transport, a floating bucket product conveyor, a variable-pitch barrel loader, a variable-pitch case packer or a variable-pitch horizontal pouch machine. Alternatively, racetrack 10 could also be utilized as a tool changer for a machine tool or as a pallet conveyor for an assembly machine. In other embodiments, linear motor modules 20,25 can be of an arbitrary shape as desired and can be assembled into a path of arbitrary shape and size in either an open-path that does not close upon itself or closed-path configuration to solve a wide variety of problems.

Figure 8:
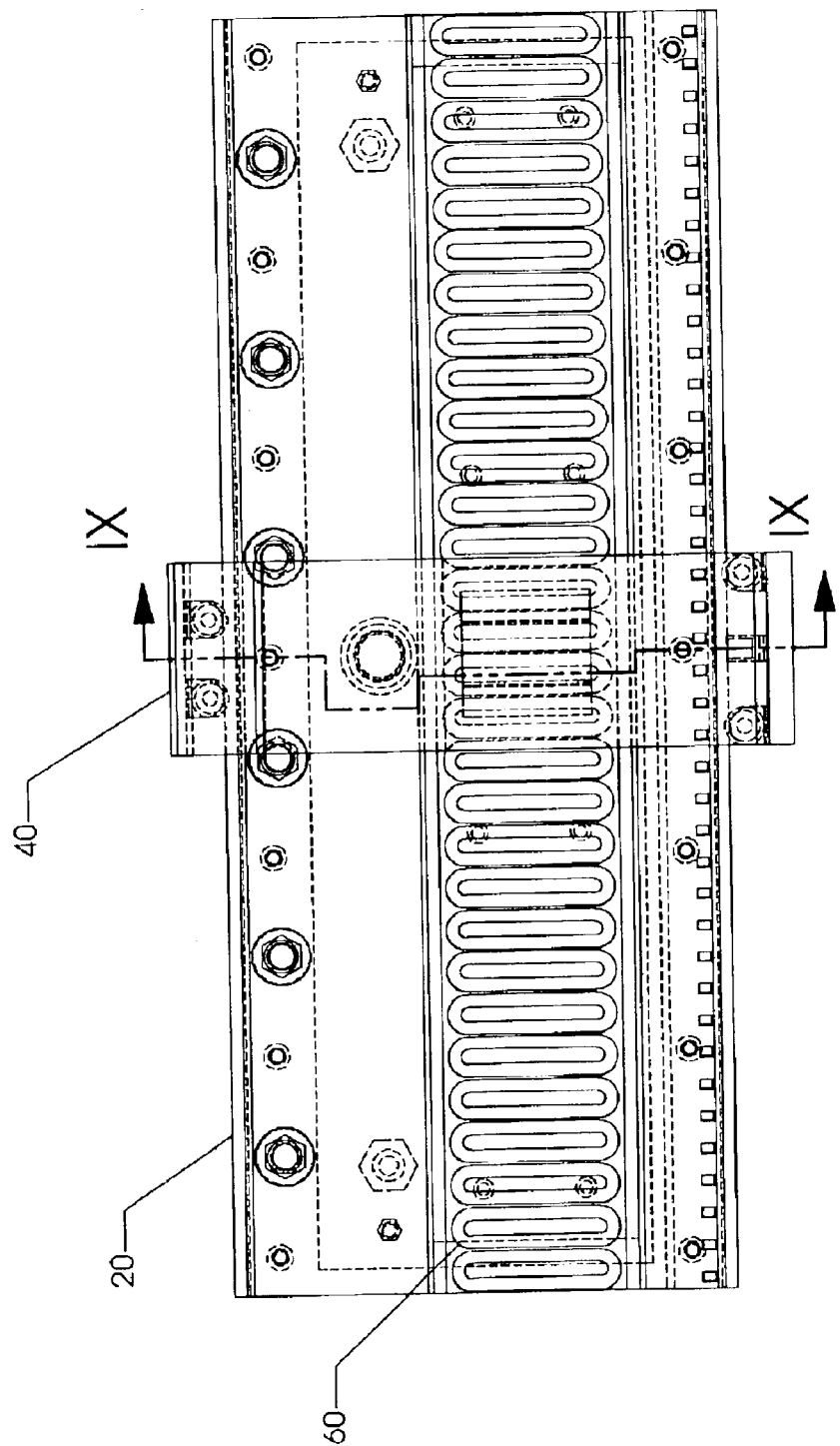
FIG. 8 is a plan view of and embodiment of a linear motor stator module and mover in accordance with the invention.
Figure 9:
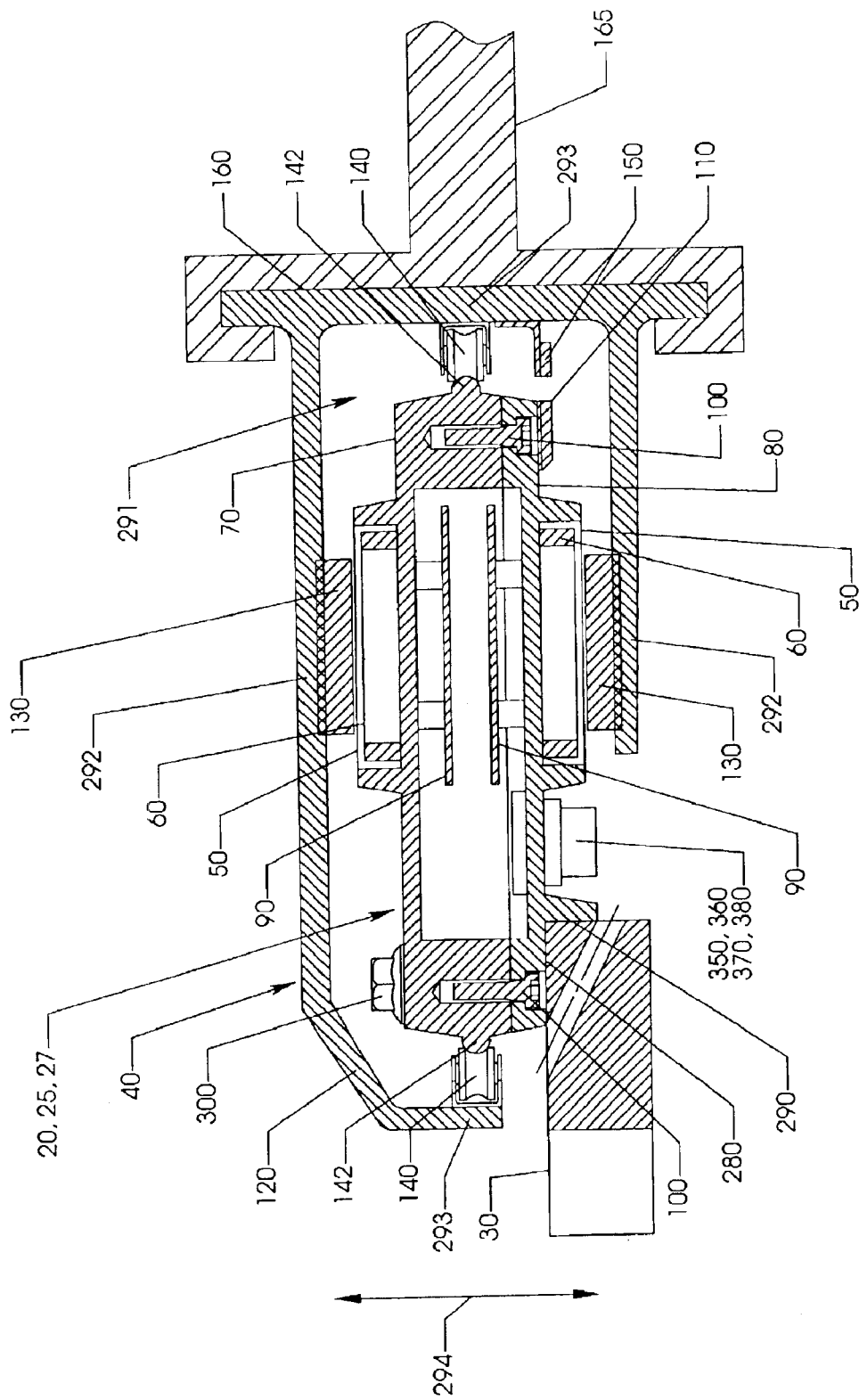
FIG. 9 is a cross-sectional view thereof taken along line IX—IX shown in FIG. 8.

In FIG. 8, a preferred mover 40 and a straight linear motor stator module 20 are shown with the armature coil encapsulation 50 removed so that the straight armature coils 60 are visible. As shown in FIG. 9, active elements 60 of this embodiment include adjacent air-core armature coils, and the reactive elements 130 preferably include a set of rare-earth permanent magnets. Alternatively, the active elements can include overlapped coils and/or either a solid core or laminated core may be employed to improve the efficiency and force production of the motor.

In this embodiment, two sets of permanent magnets 130 and two sets of armature coils 60 are employed, one on a top side and one on a bottom side of the track. This arrangement provides a balanced magnetic attraction force between the magnet sets 130 and stator plates 70, 80, which increases the life of the bearings, which preferably include roller wheels 140 mounted to ride along the track such as on rail 142. This arrangement also provides the advantage of doubling the propulsive force generated while using virtually the same volume for the motor. Alternatively, a one-sided design could be employed to save cost.

Figure 10:
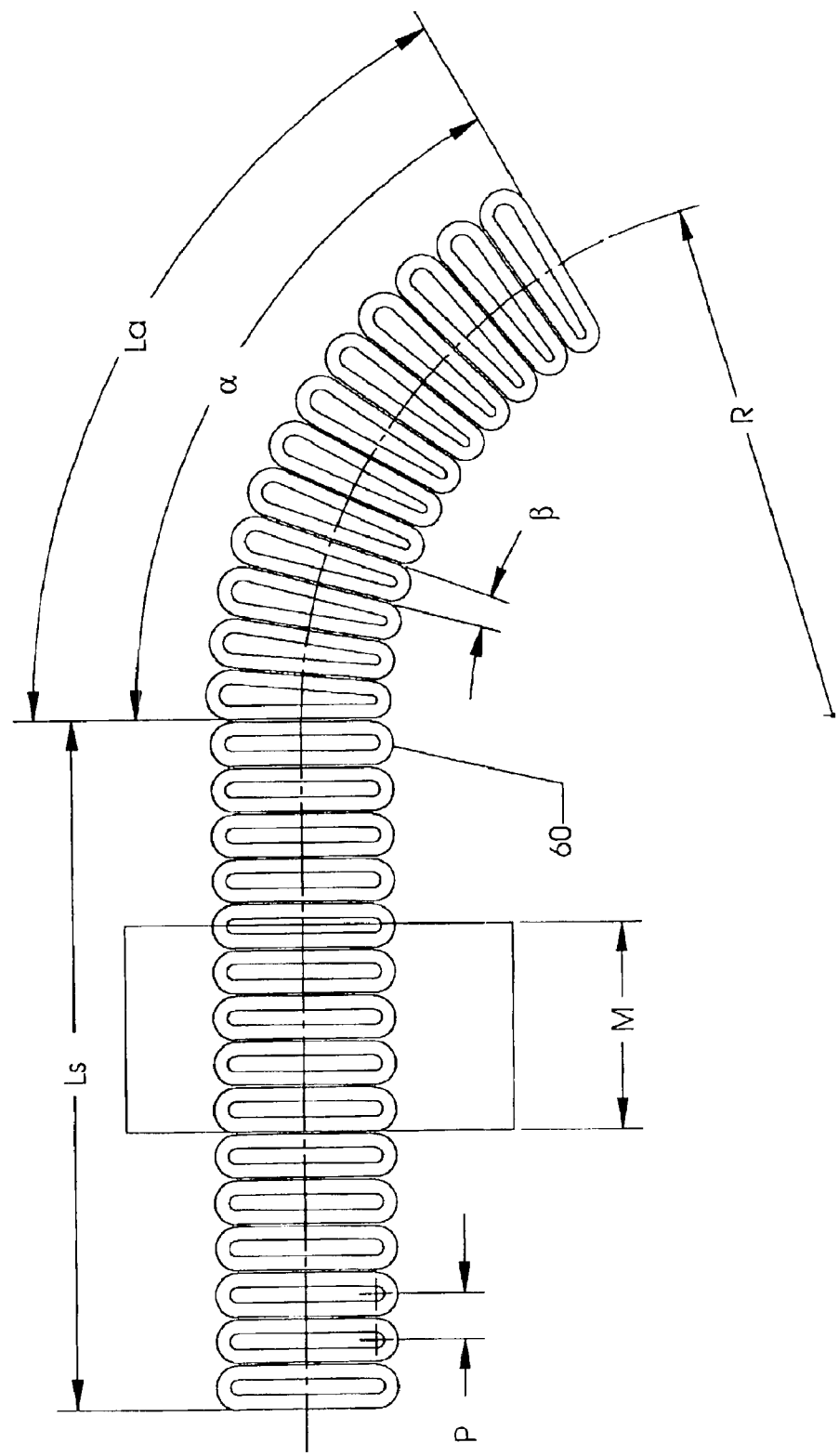
FIG. 10 is a plan view of both straight and constant-radius curved armature coils of an embodiment.

Referring to FIG. 10, the preferred number and spacing for the armature coils 60 in a preferred embodiment is determined using the following set of equations:

$$P = \frac{M}{n_e + k}$$

$$\beta = \frac{\alpha}{n_a \cdot n_e}$$

$$R = \frac{M \cdot n_a \cdot n_e}{\alpha \cdot (n_e + k)}$$

$$L_s = \frac{n_s \cdot n_e \cdot M}{(n_e + k)}$$

$$L_a = \frac{n_a \cdot n_e \cdot M}{(n_e + k)}$$

where P=coil pitch; M=mover width; $n_e$=number of coils in a set (typically, the number of electrical phases); k=drive magnet separation parameter (represents the number of coil pitches the magnets are separated by); β=curved coil pitch angle; α=curved coils total angle; R=pitch radius of the curved module coils; $n_a$=number of coils sets in the curved module; $n_s$=number of coils sets in the straight module; $L_a$=arc length at the pitch radius of the curved module coils; $L_s$=length of the straight module coils.

This set of equations provides the appropriate number of coils in each module in the preferred embodiment for the number of electrical phases; the correct coil pitch to provide the desired curved module radius, total curved module angle and straight module length; the same coil pitch for both curved and straight modules 20, 25 so they can utilize the same mover or movers 40; and an appropriate separation between movers 40 to ensure that two sets of mover drive magnets 130 are never over the same coil 60. Advantageously, this approach also provides for modular sizing of the linear motor stator modules. For example, predetermined straight lengths, for example 250 mm, 500 mm, 1000 mm, and so forth, and predetermined arc angles, for example 60°, 90°, 120°, 180°, and so forth, can easily be created by the application of these equations.

The stator modules are preferably assembled to form a single track that includes the driving elements, such as the active elements of the linear motor, and the track bearing portions, such as the rails 142, and preferably also includes one or more of module controllers and module control parameter sensors. Preferably, the single track is substantially free of portions that extend parallel to the bearing portions spaced therefrom in a lateral direction 294 with respect to the path.

Figure 11:
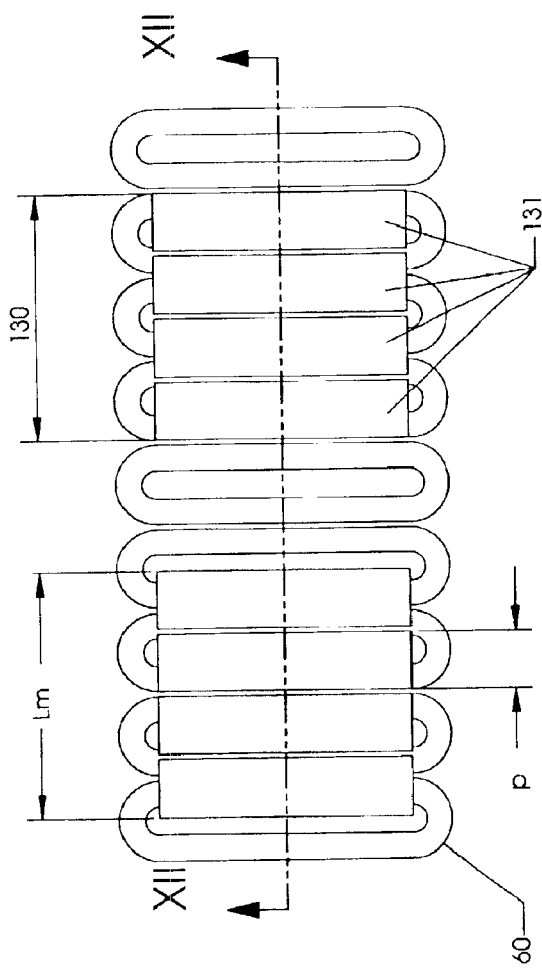
FIG. 11 is a plan view of armature coils and drive magnets of a preferred embodiment.
Figure 12:
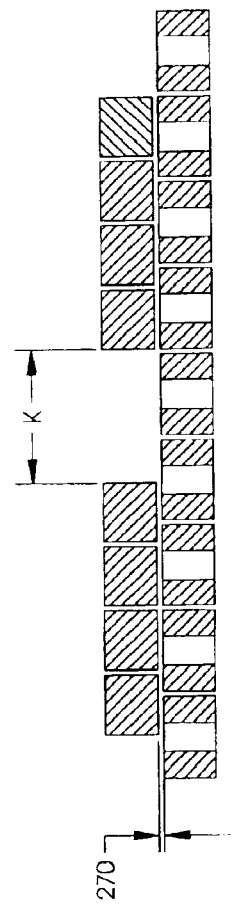
FIG. 12 is a cross-sectional view thereof taken along line XII—XII shown in FIG. 11.

Referring to FIGS. 11 and 12, two sets of reactive elements that include drive magnet sets 130, which are shown in operational proximity to a set of armature coils 60, and in operative association therewith. These magnets sets 130 operate in cooperation with the coils 60 to selectively propel each mover 40 or hold it stationary. The reactive element of an alternative embodiment has an induction plate or bar in addition or instead of the magnet sets. The length of magnet set 130 and the pitch of magnets 60 in the longitudinal direction along the track, in the direction of the path of the movers 40, preferably is determined using the following set of equations:

$$L_m = n_e \cdot P$$

$$p = \frac{n_e \cdot P}{n_m}$$

where $L_m$=length of the magnet set; $n_e$=number of coils in a set (typically, the number of electrical phases); P=coil pitch; p=magnet pitch; $n_m$=number of full magnet poles.

In a preferred embodiment, the mover drive magnet set 130 employs four full-magnet poles. The magnets 130 are made preferably from Ne—Fe—B, although alternative materials are widely known in the art that can be employed. These magnets are preferably installed with alternating polarities i.e. N-S-N-S or S-N-S-N. Preferably, magnet set 130 which includes four magnets 131 interacts with the electromagnetic field produced by the three straight armature coils 60 in proximity therewith to produce a propulsive force that moves or holds stationary mover 40. This ¾ configuration provides reduced force ripple or "cogging" relative to a matched number of coils and magnets because it does not have an equal number of coil and magnet poles. Further reductions in force ripple are achieved through various combinations of electrical current levels for each of the three armature coils 60. Alternatively, the magnets can be skewed at an angle to the path or to the direction orthogonal to the path or to the coils to produce a similar reduction in force ripple. In addition, numerous other means of reducing force ripple are known in the art and could be employed. Also, coil-magnet gap 270 by which the coils 60 and magnets 131 are spaced is held as small and constant as possible to maximize the propulsive force and to minimize variations therein.

Referring again to FIG. 9, the payload or tool 165 to be driven by the motor preferably is mounted on flange 160, and the load thereof is carried by the mover carriage 120. The propulsive force in the preferred embodiment to drive the load is generated by the interaction of the electromagnetic fields created by armature coils 60 and of the mover drive magnet set 130. The carriage 120 preferably is constrained for motion along the track by roller wheels 140 riding on bearing rails 142 that are integral to the stator top plate 70. Referring to FIGS. 1 and 9, the stator modules 20,25 preferably are mounted to a frame 30 on mounting face 280 and aligned using alignment feature 290, such as a rabbet feature of corresponding shape with the frame 30. The stator module 20,25 preferably is fastened to the machine frame 30 using a set of fasteners 300. Other means of fastening, such as a bayonet slot and locking feature arrangement, may alternatively be employed.

Figure 13:
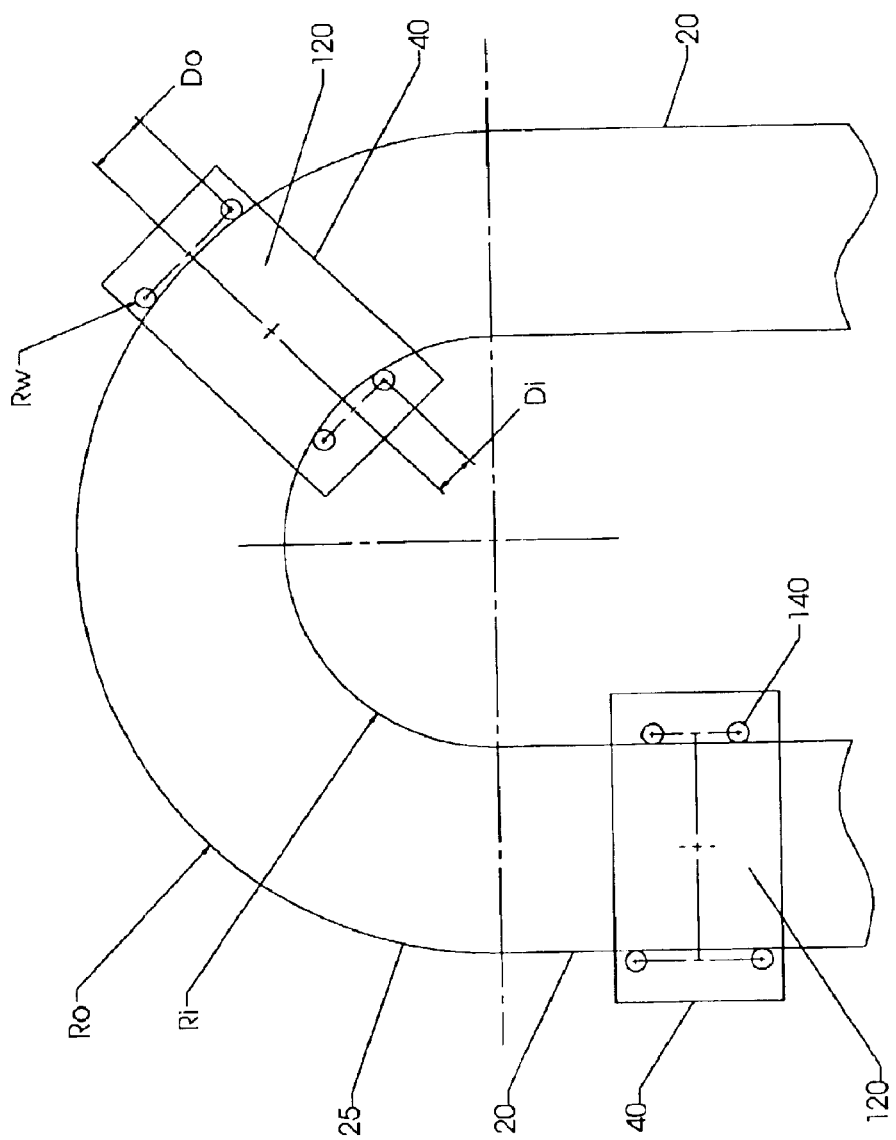
FIG. 13 is a plan view showing mover roller-wheels and bearing surfaces of an embodiment.

Referring now to FIG. 13, a plan view of a constant-radius curved stator module 25 connected to two straight stator modules 20 is illustrated, with two movers 40, one of which is traversing the curved stator, and the other of which is traversing one of the straight stators. The longitudinal spacing of roller wheels 140 is labeled $D_o$ for the outer wheels and $D_i$ for the inner wheels. The roller wheels 140 of this embodiment are in fixed positions on each carriage 120, selected to enable the movers 40 to traverse both the straight and constant-radius curved paths. These spacings preferably have a relationship determined by the equation:

$$D_i = \sqrt{(R_i - R_w)^2 - \left\{(R_i - R_o - 2 \cdot R_w) + \sqrt{(R_o + R_w)^2 - D_o^2}\right\}^2}$$

where $R_o$=the outer bearing rail radius; $R_i$=the inner bearing rail radius; $R_w$=the roller wheel radius.

Figure 14:
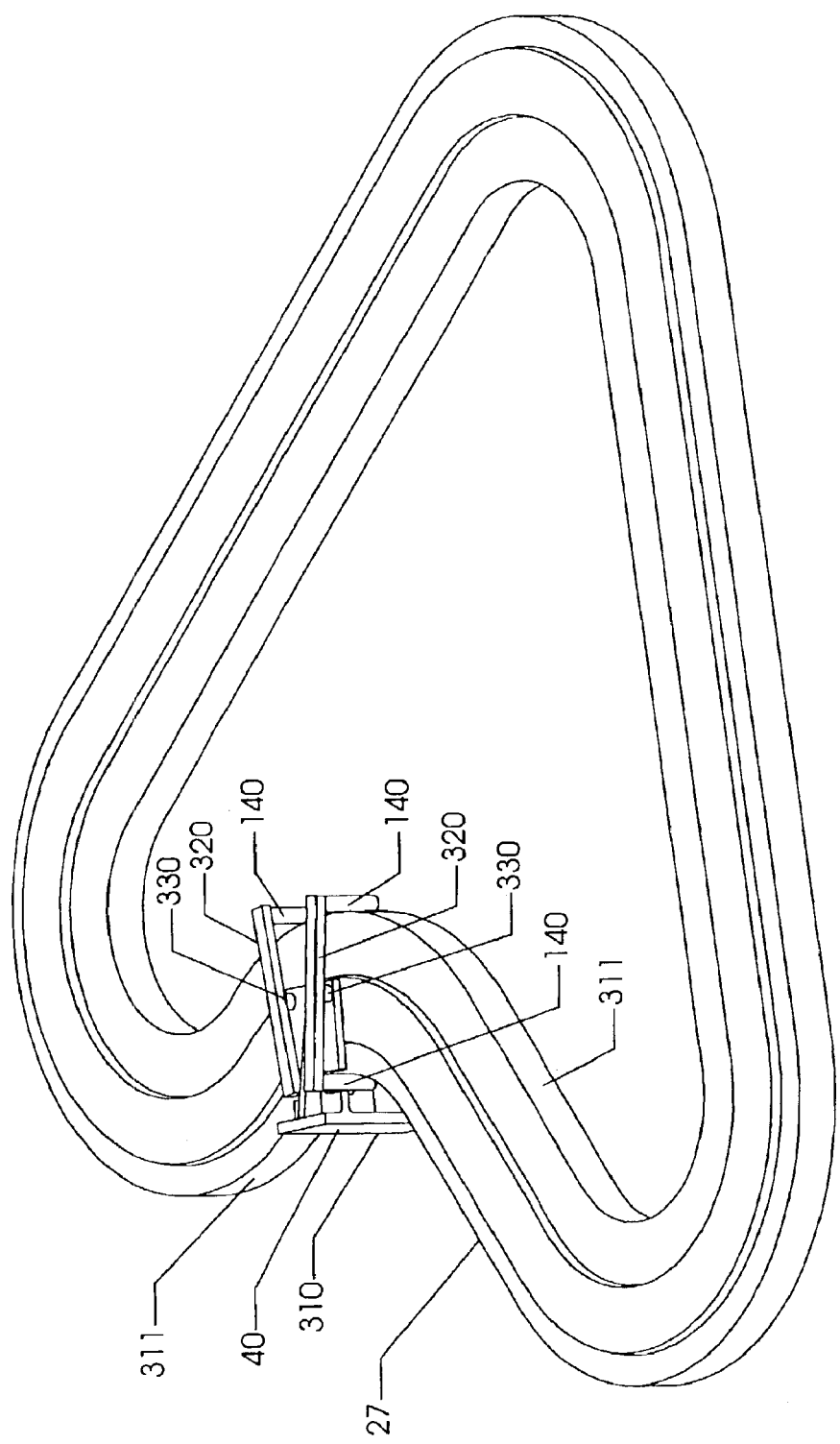
FIG. 14 is a perspective view of an embodiment in which the mover is mounted on a track to follow a path of arbitrary shape.
Figure 15:
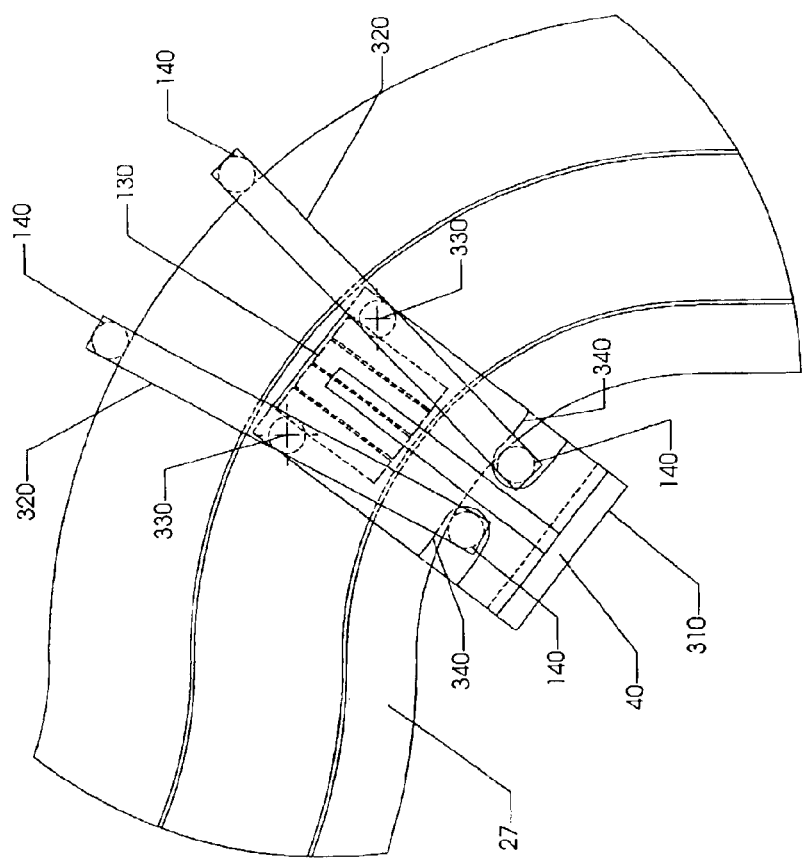
FIG. 15 is a plan view of a of the mover shown in FIG. 14.

For path shapes that utilize S-curves or non-constant radius curves, a different bearing system is employed. An embodiment capable of traversing such paths is presented in FIGS. 14 and 15. In this embodiment, mover 40 utilizes a carriage 310 to which two swivel arms 320 are pivotally mounted to rotate about swivel points 330. Each swivel arm 320 has two roller wheels 140 on each end of each arm that ride on bearing surfaces 311 of arbitrarily shaped stator module 27. Carriage 310 preferably has two cutouts 340 to provide clearance for the swivel arms 320 as they pivot thereabout. The pivots at the swivel points 330 are preferably disposed between, and most preferably centered between, the wheels 140 attached to the swing arms 320. The swing arms 320 are capable of pivoting to accommodate and follow the changing geometry of the track of the stator module 27, which preferably extends along a plane. The swing arms 320 can pivot while maintaining the carriage 310 and magnet set 130 in a substantially constant orientation with respect to the track, such as in a substantially orthogonal orientation with respect thereto, as shown in FIG. 15.

Figure 16:
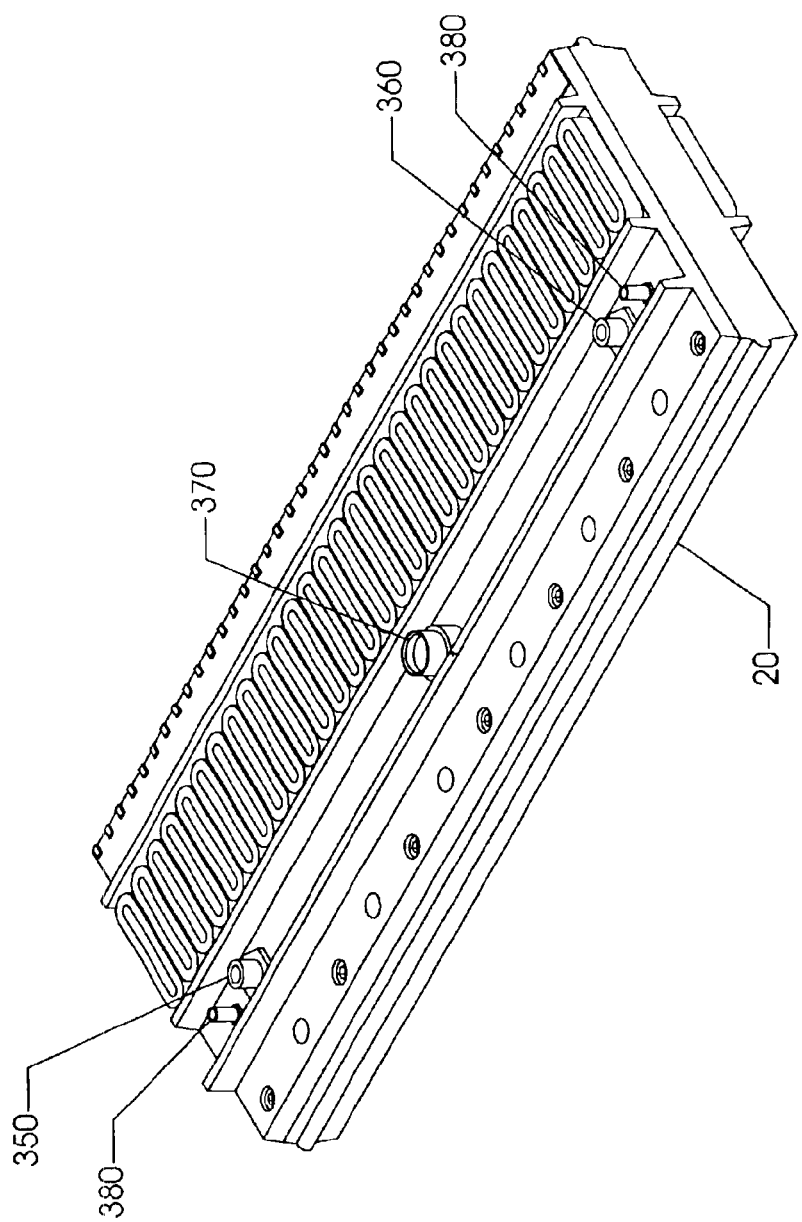
FIG. 16 is a perspective view of the backside of an embodiment of a straight linear motor module, illustrating the external connectors and the armature coils and sensing elements with their respective encapsulations removed.

Referring again to FIG. 9, armature coils 60 of the preferred embodiment are mounted to stator plates 70,80 using an electrically non-conductive adhesive and/or a non-conducting retainer that is fastened to plates 70,80. The wire of the coil is routed through the stator plates 70,80 and connected to the controller 90. The coils are then encapsulated with coil encapsulation 50, as depicted in FIGS. 2 and 3. Coil encapsulation 50 preferably is made from a material that is electrically nonconductive, thermally conductive and corrosion resistant. Numerous choices are commercially available to satisfy these requirements. The cooling of armature coils 60 can be achieved by attaching cooling coils to the inside of stator plates 70,80 and forcing air or a liquid through these coils. Referring to FIG. 16, the connection point for this cooling circuit is made at cooling fittings 350 and 360 that are located on the back side of the stator module 20, 25, 27.

The mover 40 preferably defines an interior passage 291 in which the track 10 is received longitudinally with respect to the path to be traveled by the mover 40. The mover 40 thus preferably surrounds the track 10 to extend therearound on preferably two pairs 292,293 of opposite sides of the interior passage 291, preferably with bearing members 140 disposed on one of the pairs 293, and the magnets 130 disposed on the other of the pairs 292. The two pairs 292,293 of opposite sides preferably are oriented in different directions, preferably within about 30° and 150° from each other.

Figure 17:
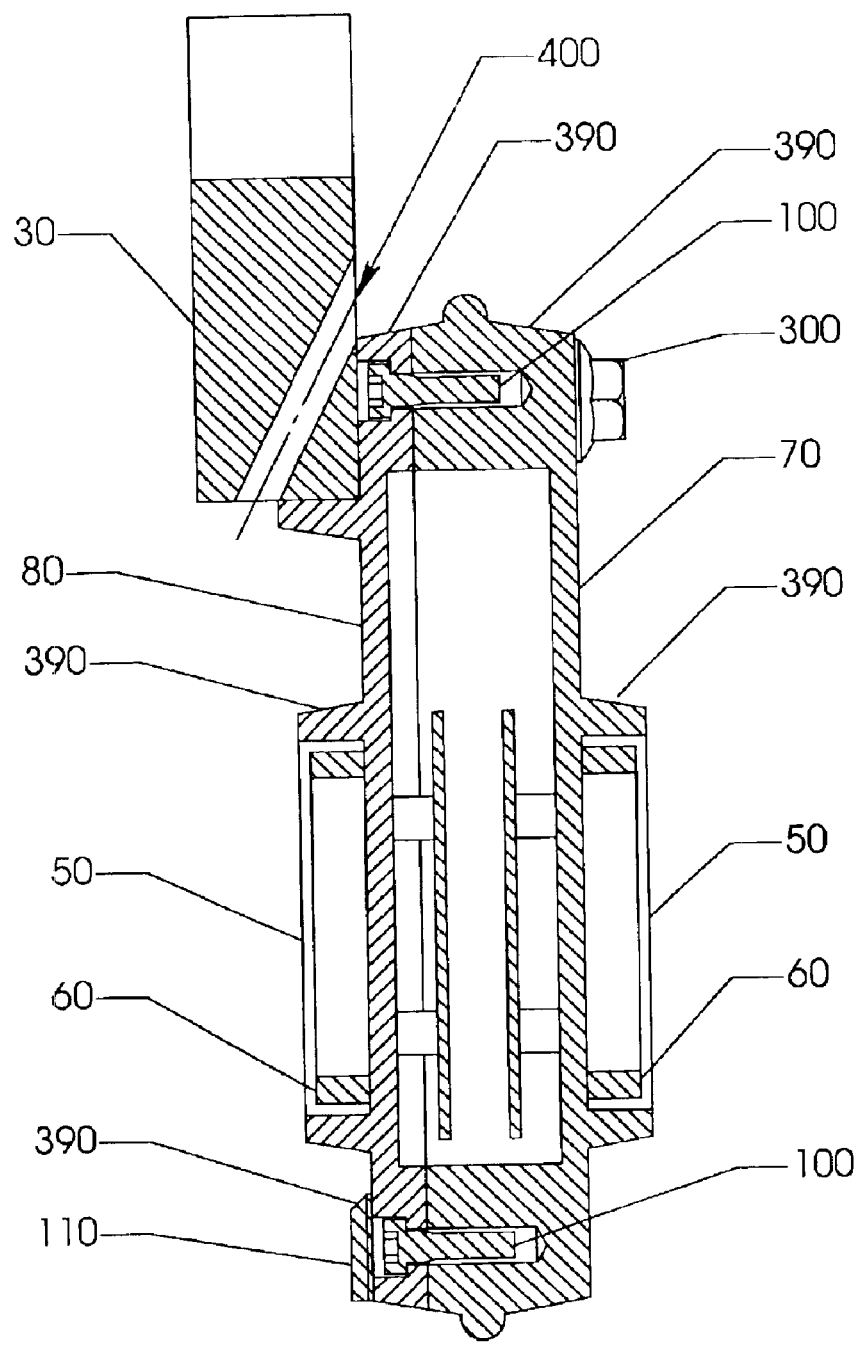
FIG. 17 is a cross-sectional view taken along line IX—IX shown in FIG. 8, oriented vertically and illustrating the sanitary design features of the embodiment.

Referring to FIG. 17, one preferred embodiment includes features for application in sanitary environments. The stator modules 20,25,27 and mover 40 are preferably designed in accordance with the requirements for non-product contact surfaces defined in the "USDA GUIDELINES FOR THE SANITARY DESIGN AND FABRICATION OF DAIRY PROCESSING EQUIPMENT," which are incorporated herein by reference thereto. Under these guidelines, no crevices or undrained cavities should exist; no fasteners with exposed threads, Allen heads or slot heads should be used where product residue may accumulate; and separable components should be suitably gasketted where necessary. To conform to these requirements, a preferred embodiment utilizes encapsulation 50 to completely cover coils 60 to reduce or eliminate crevices between stator plates 70,80 and the coils 60. Further, all Allen or slot head fasteners 100 are preferably completely covered by either frame 30 or control parameter sensor 110. Exposed fasteners heads, such as mounting fasteners 300, preferably utilize wrenching features with no female cavities. All threaded fasteners can use blind tapped holes to eliminate exposed threads. In addition, the geometries of stator 20,25,27, mover 40, and frame 30 preferably are configured so that they are self-draining. For the track in the vertical orientation illustrated in FIG. 17, surfaces 390 of the track, such as adjacent to rail 142, are angled, and drain hole 400 is provided in frame 30 where it forms a concave angle with the track to facilitate proper drainage of all flowable materials, such as fluids and solid particles. Also, gaskets preferably are employed between stator plates 70 and 80 and between bottom stator plate 80 and connectors 350,360,370,380, which are shown in FIG. 16.

Thus, in a preferred embodiment, a cover is disposed and configured for enclosing the active elements and the fasteners for preventing collection of the flowable material. The cover can include several parts, such as encapsulation 50 or portions that cover screws. The track and portions of the system mounted thereto are also preferably substantially free of any upwardly facing concave portions that could otherwise trap the flowable material, so that the flowable material is drained from upwardly facing portions thereof.

The preferred embodiment preferably employs a control parameter sensor. This control parameter can include, for example, position, velocity, acceleration, jerk, force, current or other desired parameter. Preferably, this sensor is capable of determining the true absolute position of each mover 40. The term "true absolute" position means that no homing or movement to locate a known datum point is required to determine the position of the mover 40 relative to the stator module 20, 25, 27. Advantageously, the sensor is capable of determining the absolute position of each mover 40 immediately after the sensor is powered on without any movement of mover 40 being necessary.

Figures 18, 19:
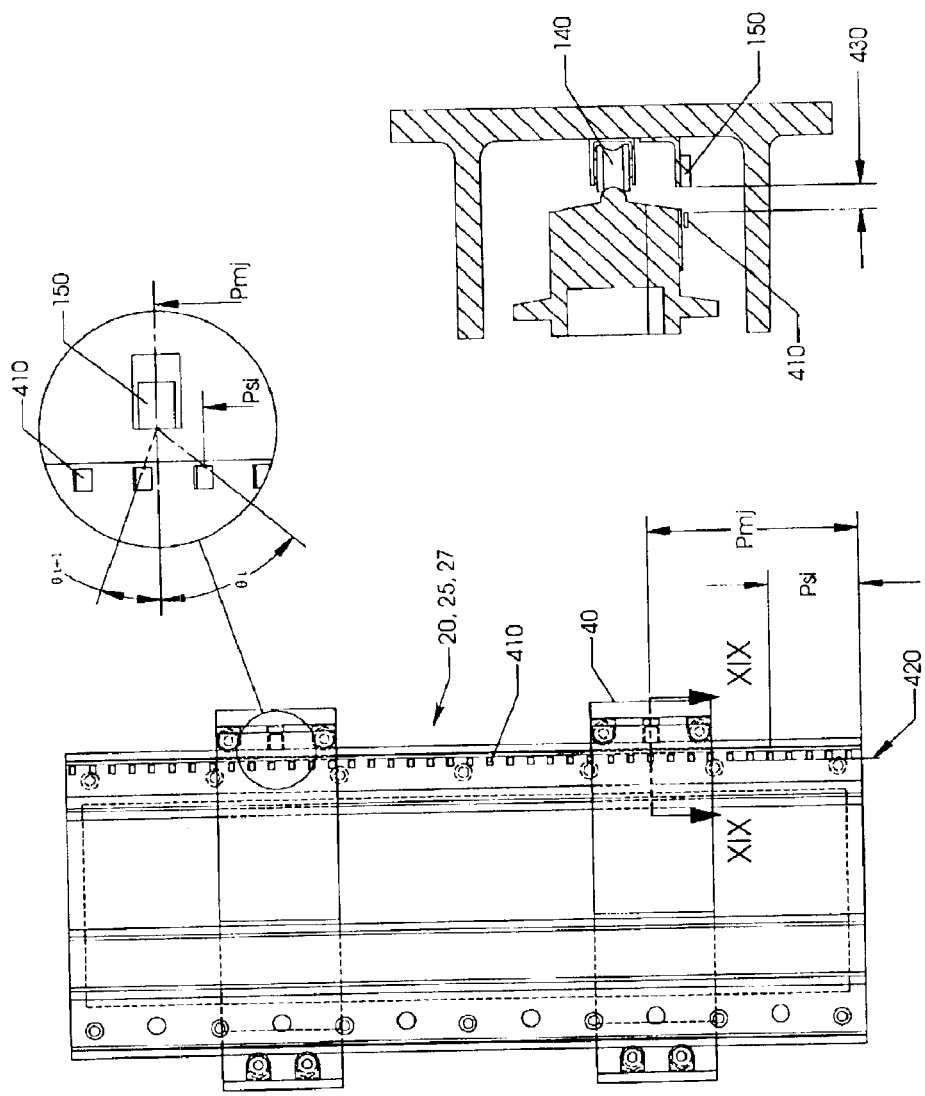
FIG. 18 is a plan view with an enlarged detail view of a preferred embodiment of a position sensing system.
FIG. 19 is a cross-sectional view taken along line XIX—XIX shown in FIG. 18.

A preferred embodiment of a true absolute position sensor employs a linear array of magnetoresistive sensors, as depicted in FIGS. 18 and 19. A plurality of magnetoresistive sensor elements 410 preferably is mounted on a circuit board in a linear or curvilinear sensor array 420 along the longitudinal axis of the stator module 20,25,27. Each mover 40 preferably has a position magnet 150 mounted thereon. The mover bearing system, including roller wheels 140, maintains the position magnet with respect to the sensor array 420, substantially maintaining a magnet-to-sensor gap 430 in a radial direction from the longitudinal axis within predetermined tolerances. Advantageously, this type of sensing element is relatively insensitive to variations in this gap because it measures magnetic field angle, instead of magnetic field intensity. The sensor elements 410 in operational proximity to each position magnet 150 produce a voltage based on the angle between the magnet 150 and the sensor element 410.

Figure 22:
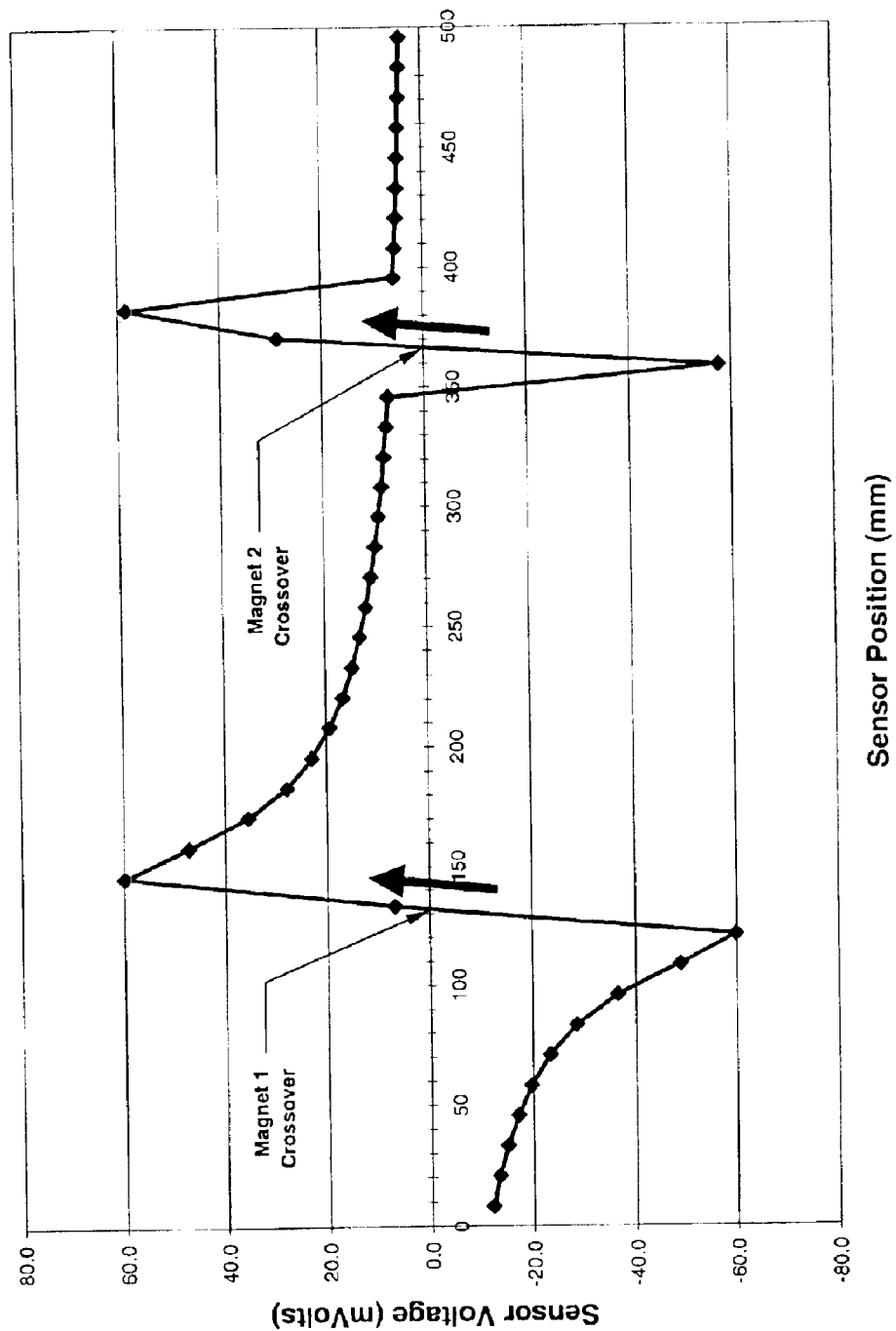
FIG. 22 is a chart illustrating an example of magnetoresistive sensor element voltage-readings versus the position of each sensor element along the array for two movers of an embodiment.
Figure 24:
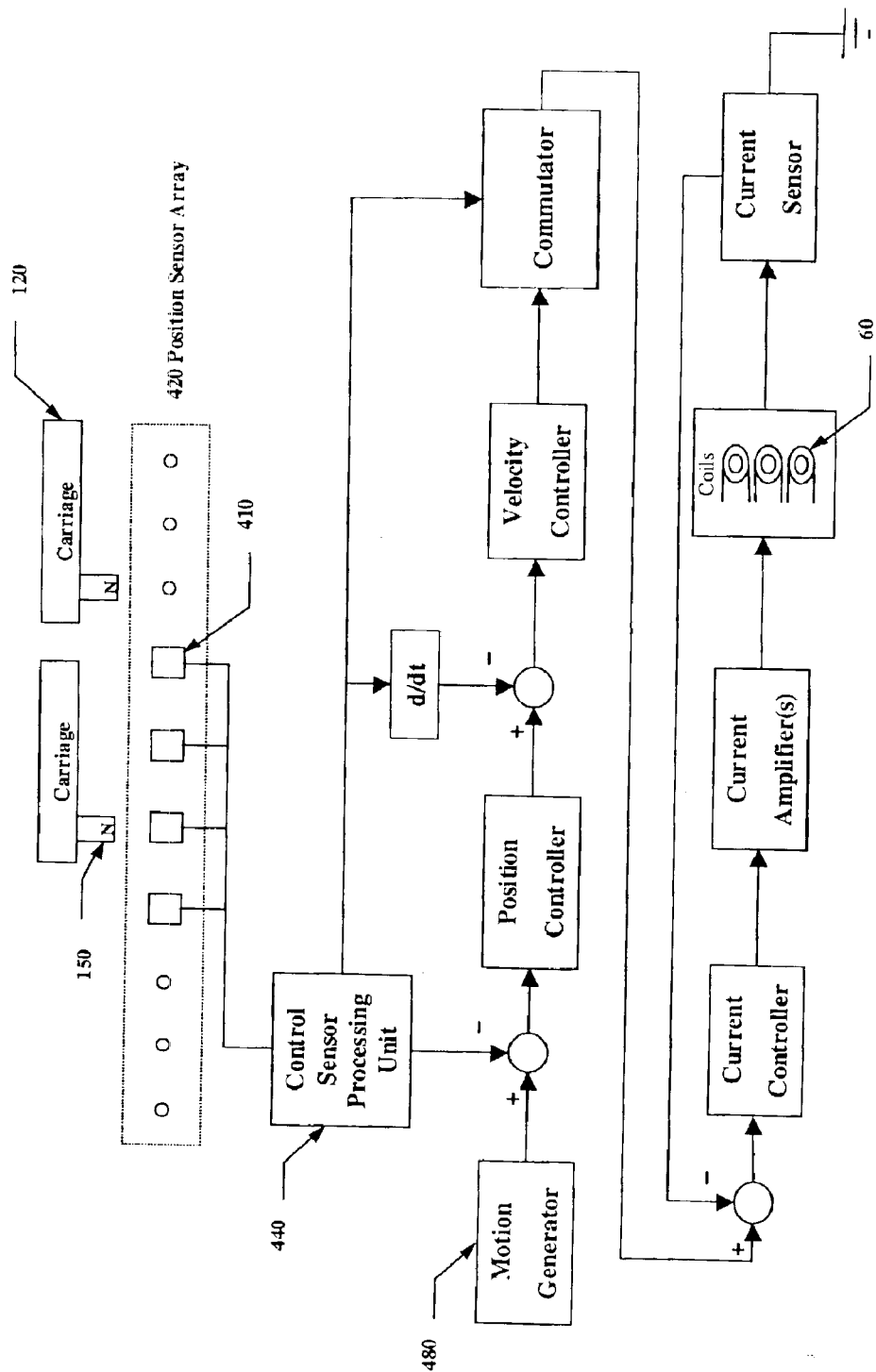
FIG. 24 is a schematic of an embodiment of a linear motor module control system.

Referring to FIG. 24, the control sensor processing unit 440 preferably scans the array at a predetermined rate and determines the voltage level of each sensor 410. Using the pattern of voltage readings, the presence of a position magnet is determined when the voltage readings of adjacent sensors cross over from negative to positive. For example, the sensor array voltages illustrated in FIG. 22 shows two mover position magnets at 132.5 mm and 367.5 mm and their associated voltage crossovers. It is important to note that reverse crossovers like the one at 347 mm do not indicate the position of the mover 40, but rather an impending crossover, in this case the one seen at 367.5 mm.

Having determined the proximal sensors from the voltage crossovers, the voltage readings from one or more of the proximal sensors can be used to determine the angle of the position magnet relative to the sensor utilizing the following equation:

$$\theta_i = \arcsin\left(\frac{V_i}{V_s \cdot S}\right)$$

where $\theta_i$=relative angle between sensor element i and the mover position magnet (radians), $V_i$=sensor element i voltage reading (mV), $V_s$=sensor supply voltage (V), S=sensor material constant (mV/V).

Obviously, if more than one sensor is employed in the calculation of the angle $\theta_i$, then the results would need to be averaged, possibly using weights based on calculated distance from the magnet. Once the relative angle $\theta_i$ is known, then the absolute position of the mover 40 relative to the stator module 20, 25, 27 is calculated using this equation:

$$P_{Mj}=P_{Si}+G \cdot \tan(\theta_i)$$

where $P_{Mj}$=position of mover j; $P_{Si}$=the previously calibrated absolute position of the sensor element i relative to its stator module; G=air gap between the sensor element and the magnet. In the case of the curved stators 25,27, position P is the curvilinear distance along the sensor array 420.

Figure 23:
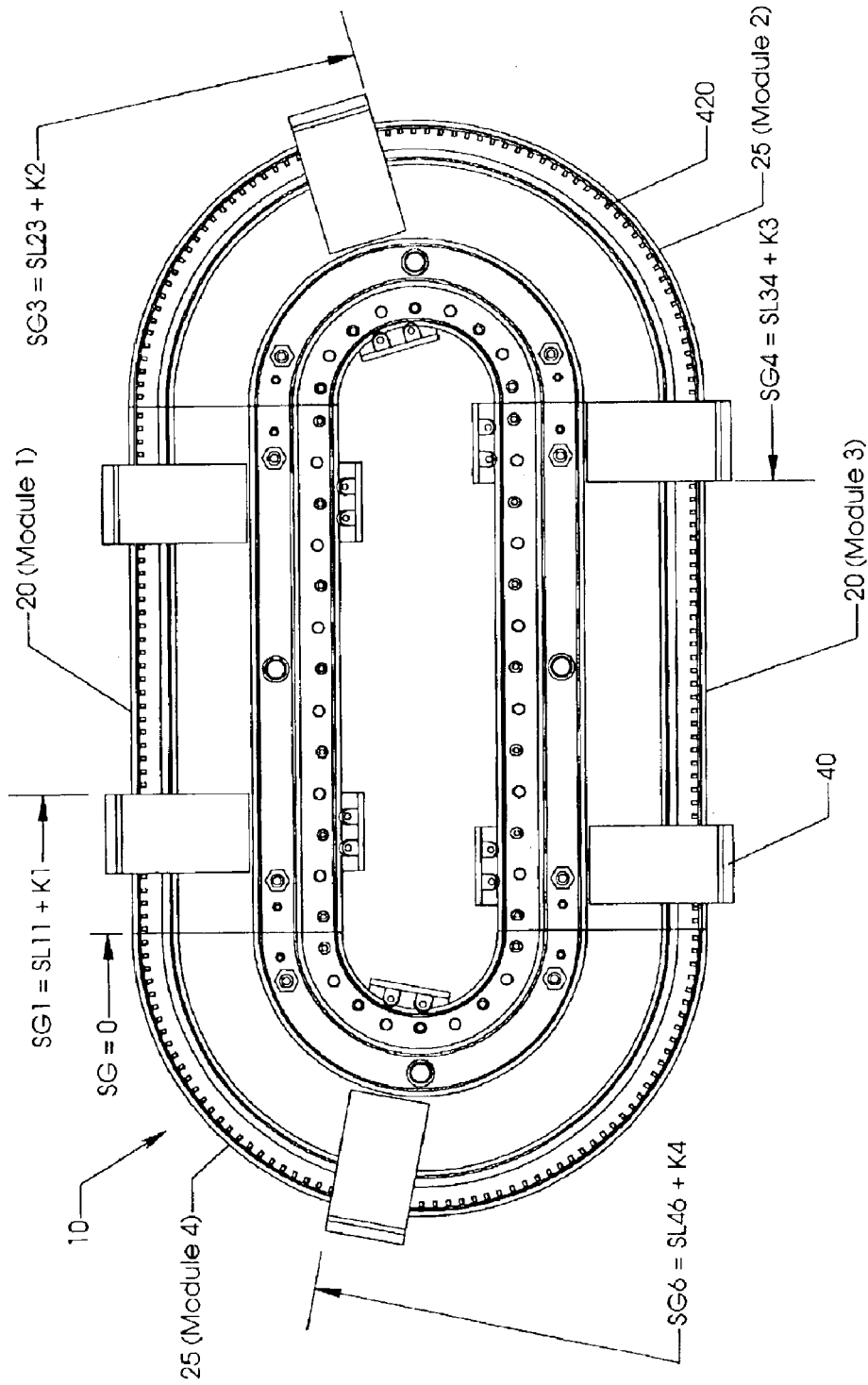
FIG. 23 is a plan view of the underside of the racetrack embodiment of FIG. 1 showing the relationship between local and global positions of several movers.

Referring to FIG. 23, the underside of track 10 is shown in a plan view with the position sensor arrays 420 for each of the four modules visible. Each sensor array 420 preferably determines a local absolute position along the length of its stator module 20,25,27 as previously described. To determine the absolute global position of a each mover 40 along the path of racetrack 10, a global position offset is added to the local absolute position of each mover 40 to yield a global absolute position as defined in the following equations:

$$S_{Gj}=S_{Lij}+K_i$$

$$K_i = \sum_{n=1}^{i} L_{n-1}$$

where i=module identification number; j=mover identification number; $S_{Gj}$=absolute global position for mover j; $S_{Lij}$=absolute local position for mover j on module i; $K_i$=module i absolute global position offset; and $L_n$=length of module n wherein $L_0$ would normally be zero. $K_i$'s preferably are determined at the time the linear motor modules 20,25,27 are assembled into a system and are stored in each module's non-volatile memory.

The magnetoresistive sensors employed in this embodiment sense the magnetic field angle relative to the sensor. This detected angle advantageously allows the sensor element 410 to determine the position of the position magnet 150 relative to the sensor element without any movement of the mover 40, which translates into the ability to perform true absolute position sensing and eliminates the need to perform homing (zero reference) and commutation alignment (magnetic pole position) of the motor after any stoppage or abnormal events such as crashes, jams, etc. This advantageously reduces lost production time and lost product.

In this embodiment, only one array or track of sensors is required regardless of the number of movers, although more than one can be used in other embodiments. Since the sensor array is scanned and examined for voltage transitions, as many movers as can be physically assembled onto the track can be added without any additional hardware required, creating a truly scaleable design.

In addition, the sensor array 420 can be configured so that more than one sensor is in operational proximity to any given position magnet, such that the sensor system has built-in redundancy. Therefore, if one sensor in the array fails, the neighboring sensors can "step in" and take over the job of the failed sensor. This ability to continue operating even with a failed sensor element, a so-called "soft" failure, results in increased overall system reliability. In one embodiment, the sensor system is configured to detect the failure of a sensor element and notify maintenance personnel to fix this problem at the next scheduled shutdown.

Additionally, this embodiment functions without ongoing contact with the movers and is relatively insensitive to changes in the air gap 430 between the position magnet 150 and the sensor elements 410 because they operate in a magnetic saturation mode. This eliminates the need to maintain a tight tolerance on the air gap 430.

Further, this position sensor design preferably requires no power source (e.g., a battery) aboard mover 40 and has no wires or cables connected to mover 40. In combination with magnet set 130, this results in the preferred mover 40, which is "passive," meaning it has no onboard power source and no external wire or cable connections to interact with the sensor or the active elements. Thus, in this embodiment, the activation element, such as the position magnet 150, as well as the reactive elements, such as the magnet set 130, of the mover are passive elements because they require no physical connection to a power source, such as a wire connection. Preferably the passive elements do not require any power source. In one embodiment, the passive elements can have a current that is induced by an external electromagnetic field.

Advantageously, this embodiment transmits information at about the speed of electrons from the mover to the sensor, where the information is transmitted to a controller. The preferred embodiment thus has a bandwidth capability of about 5 MHz.

As an alternative embodiment, Hall effect elements may be employed as position sensing element 410. In this embodiment, the magnetic field flux from the position magnet 150 is sensed and a distance from the sensor element 410 is inferred from this data.

Figure 21:
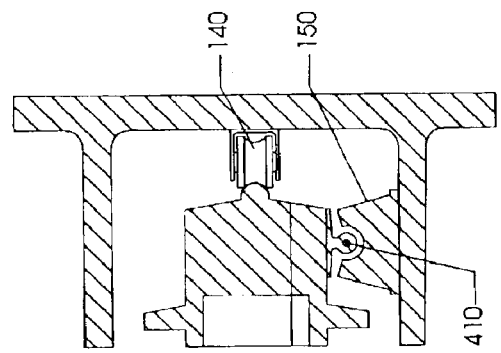
FIG. 21 is a cross-sectional view taken along line XXI—XXI shown in FIG. 20.
Figure 20:
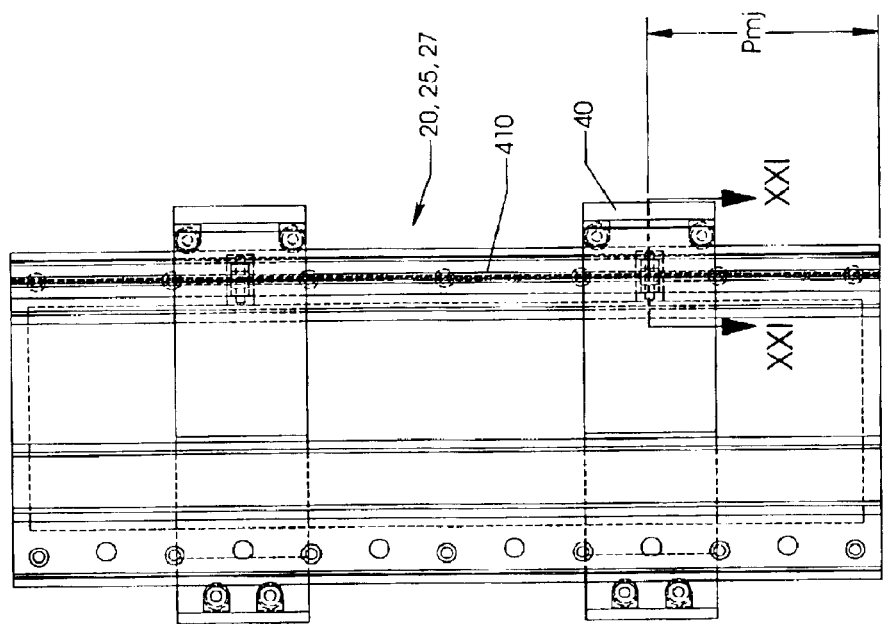
FIG. 20 is a plan view with an enlarged detail view of an alternative embodiment of a position sensing system with a single magnetostrictive sensor.

Another alternative embodiment is depicted in FIGS. 20 and 21. In this embodiment, a single magnetostrictive sensor is mounted along the longitudinal direction of the stator module and employed as position sensing element 410. A circular permanent magnet is utilized as the control sensor activation element 150. Advantageously, this embodiment does not overlap the magnetostrictive sensor elements as described in the prior art and thus eliminates the complexity associated with this approach.

Another embodiment uses a capacitive position sensor with a wireless read head mounted on the mover 40 and the scale mounted on the stator module 20, 25,27. Sensors of this type are available, for instance, from Netzer Precision Motion Sensors of Misgav, Israel. In addition, any other position sensing method capable of determining true absolute position could be employed to detect mover position, preferably at substantially any point along the track, substantially without homing. This could be a magnetic, capacitive, inductive, optical, or other type of absolute position sensor, preferably that transmits information at the speed of electrons, photons, or an electromagnetic field.

Figure 25:
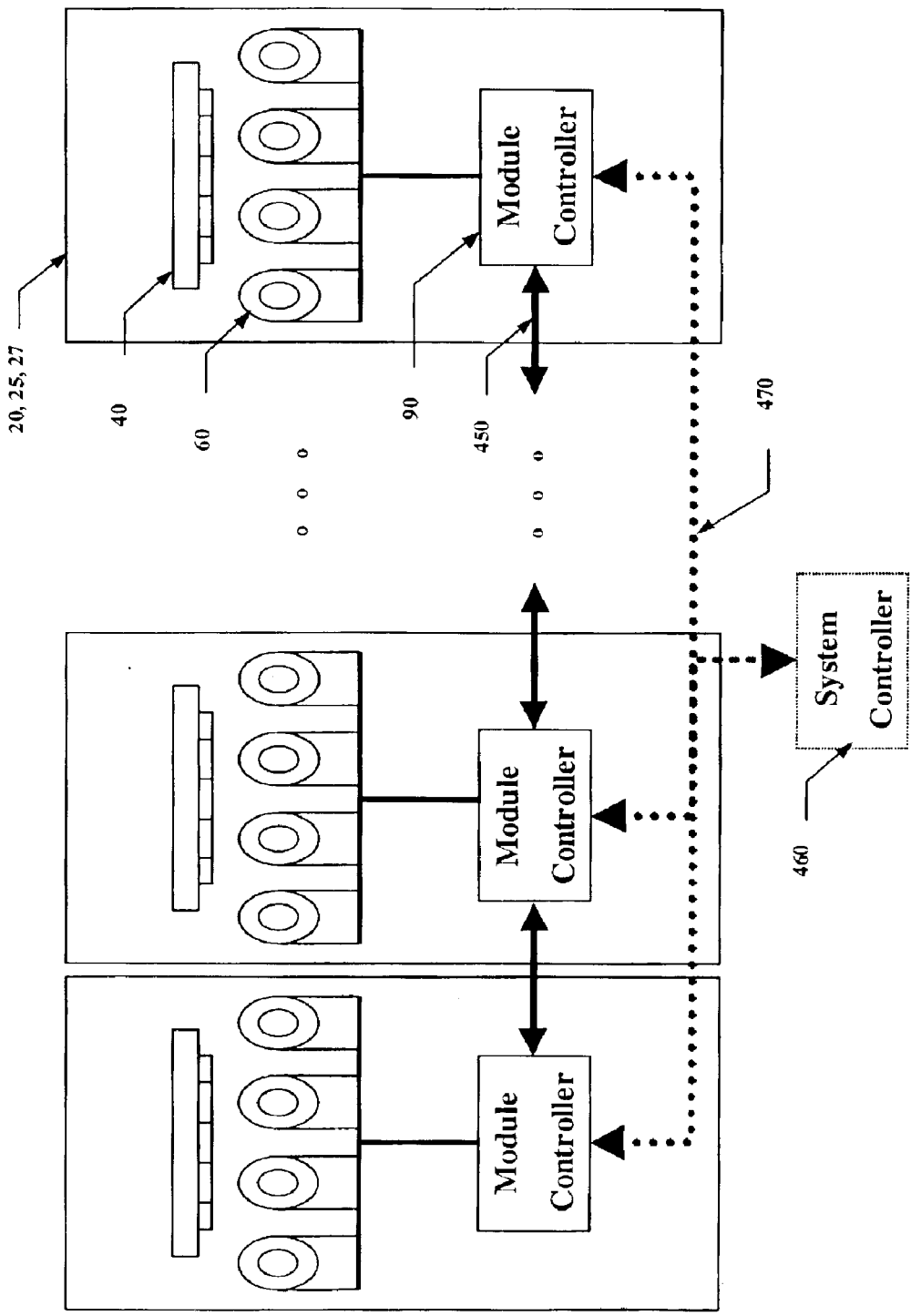
FIG. 25 is a schematic of an embodiment of a control system for several linear motor modules connected together to form a motor system.

The preferred embodiment utilizes a modular, integrated controller. Referring to FIG. 25, each motor module 20,25, 27 preferably contains an integrated module controller 90 that provides both motion control and power processing. The module controllers 90 preferably communicate to the other modules through network connection 450. Preferably, a system controller 460 is not required, but in some embodiments, the system controller 460 would be connected to these modules through system network 470.

Referring again to FIG. 9, the preferred module controller 90 is mounted to the inside of stator plates 70,80. Locating these components in this location advantageously provides a motor integrated with the track and eliminates the need for a separate electrical panel on which to mount these items and the electrical wires running to this panel. These electronics preferably are cooled using the same cooling coils used for the armature coils. As depicted in FIG. 16, external connections for the power and network signals preferably are made through the power connector 370 and network connectors 380, respectively.

Figure 26:
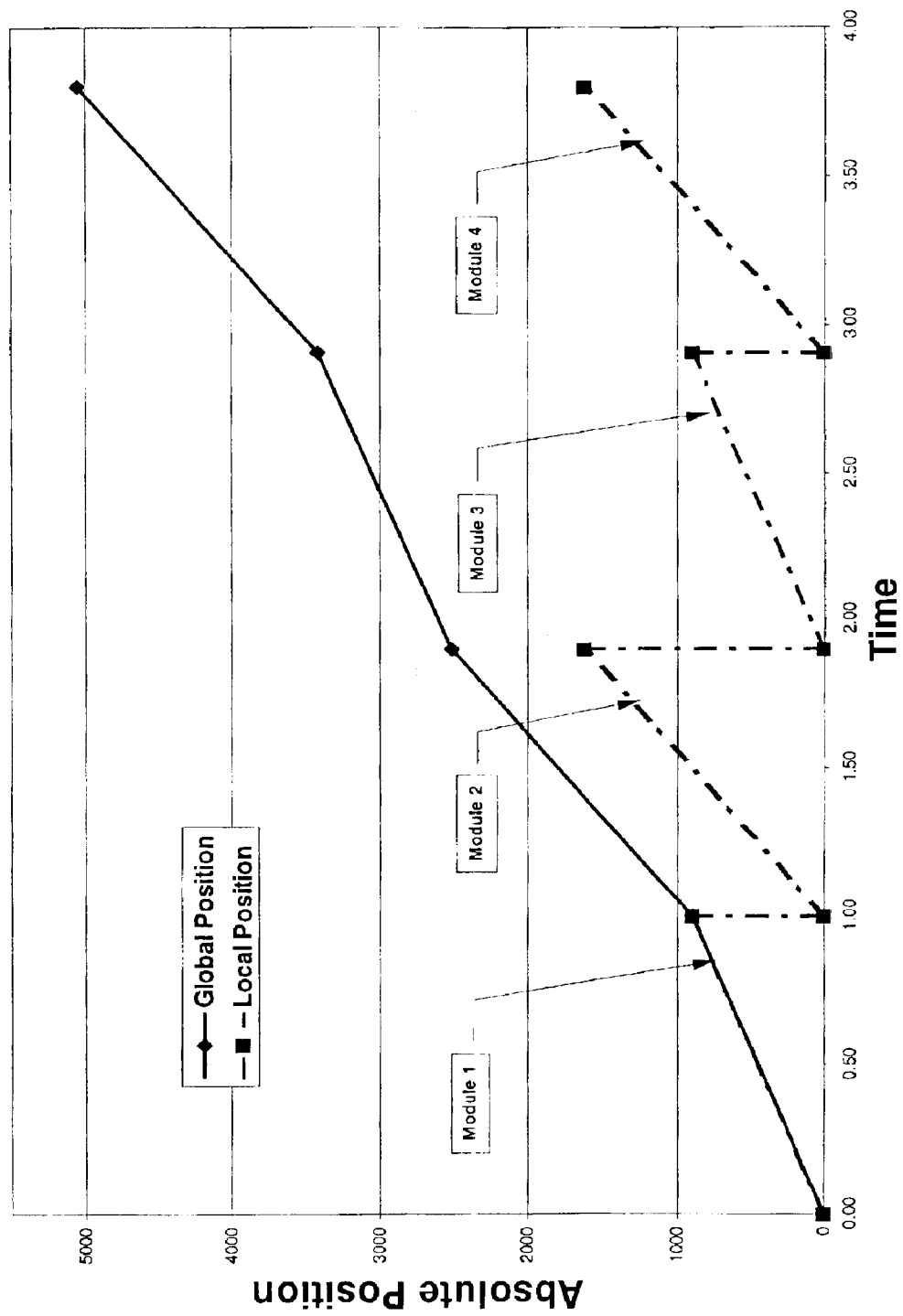
FIG. 26 is an example of a position-versus-time profile, depicting both local and global positions for the system of FIG. 23.

Preferably, a servocontrol system, as depicted schematically in FIG. 24, has a motion generator 480 to determine the desired position for each mover 40. Motion generator 480 can be programmed in a variety of modes depending on the application. For example, as depicted in FIG. 26, a predetermined motion profile could be utilized where a position versus time is prescribed for each mover 40. This figure also illustrates a comparison of both the global and local positions prescribed.

Preferably, motion generator 480 utilizes a seventh order polynomial to describe the desired position versus time profile. Use of this technique is known in the art for rotary motors and advantageously provides the ability to prescribe position, velocity, acceleration and jerk at both the initial and final points in a motion segment. The use of a seventh order polynomial is particularly advantageous in closed track embodiments of the invention, in which changes to the motion profile can be made at very high mover speeds in a smooth and accurate manner since continuity of velocity, acceleration and jerk can be maintained. For example, motion generator 480 could be programmed to respond to an external event such as a registration pulse, a signal from an interfacing station or to synchronize to an external axis simply by recalculating the coefficients of the polynomial. In this embodiment, motion generator 480 provides the additional capability of updating the motion profile at the next position update cycle in response to this external event. In some embodiments, shifting of the position versus time table in motion generator 480 could be used to affect changes in the motion profile, but this method is typically not as smooth or accurate as the seventh order polynomial technique.

In another embodiment, module controller 90 is programmed to operate in a force mode similar to the torque mode available on rotary servomotors. As a further alternative, module controller 90 could be designed to operate in an open loop control mode providing only a commanded control parameter without any feedback to confirm the system has followed the command.

Module controller 90 preferably includes all of the necessary hardware and software to implement the described control system. Preferably this would include motion control software, one or more processors with both volatile random access memory and non-volatile memory, data and address busses, power electronics and network communication ports.

In a preferred embodiment of the control system, each armature coil 60 has its own power source. This power source preferably comprises a solid-state, closed-loop current amplifier that is controlled by digital logic, as depicted in FIG. 24. As mover 40 moves into operational proximity to a given armature coil 60, module controller 90 utilizes the position information from position sensor 110 to determine the proximal coil 60 and turns on its power source to create an electromagnetic field that assists the other proximal armature coils 60 in propelling or holding stationary mover 40. Since each armature coil 60 has it own independently controlled power source, preferably only those armature coils 60 in operational proximity to mover 40 are energized. Further, this arrangement allows an electromagnetic field of arbitrary shape and intensity to be created to control the motion of mover 40.

In an alternative embodiment, each mover 40 has an amplifier associated with it and a current switching device is interposed between the amplifier and the armature coils 60. In this arrangement, the switching device routes the current from each amplifier to the coils in operational proximity to the appropriate mover 40.

In a preferred embodiment, the control system utilizes a temporary or "soft" identification number for each mover 40, as opposed to a permanent or "hard" identification number. This eliminates the need for an identification magnet, tag or similar device as is taught in the prior art to identify each mover 40. At initialization, each mover 40 is assigned an identification number starting with the mover 40 that is at the lowest global absolute position along the entire path and then each subsequent mover 40 is given the next sequential identification number. At the next initialization, this process is repeated with each mover 40 being assigned a new identification number depending on its initial location. During operation, each mover 40 is preferably tracked by using its last known position plus a tolerance window based on the position update rate and maximum mover speed. During each position update cycle, the new position readings are compared to the windows for each identification number. If a reading falls within the window, the mover's position is updated to reflect this value. If no reading falls within the window, then a fault is generated for the control system to act upon.

Further, a preferred embodiment of the control system provides headway control for each mover 40 to prevent crashes between them. During each position update cycle, the control system uses the absolute global position of each mover 40 to calculate the distance between it and the adjacent movers 40. These numbers are compared to a preset minimum separation or headway distance. If the actual separation is less than the minimum allowable, a fault is generated that the control system would then act upon in a programmed fashion.

Further, a preferred embodiment of the control system coordinates the transfer of control of movers 40 from one module 20, 25, 27 to the next. When a mover 40 reaches a predefined zone near one of the ends of the module 20, 25, 27 it is currently traversing, a message is sent over module network 270 by the module controller 90 to the adjacent module controller 90 containing the mover identification number and any additional parameters e.g. registration adjustment, etc. necessary to properly control mover 40. Once the mover 40 has crossed the module boundary line, then control is passed to the next module. A hand-shaking procedure is executed by both modules to formally transfer control. Alternatively, a hysteresis zone could be utilized in the control transfer algorithm if the possibility of dithering around the module boundaries exists.

While illustrative embodiments of the invention are disclosed herein, it will be appreciated that numerous modifications and other embodiments may be devised by those skilled in the art. Therefore, it will be understood that the appended claims are intended to cover all such modifications and embodiments that come within the spirit and scope of the present invention.

What is claimed is:

1. A controlled motion system, comprising:
   a track;
   a plurality of movers movably mounted on the track for moving along a path;
   active and reactive elements associated with the track and movers and configured for driving and controlling the position of the movers along the path;
   a controller operably associated with the active elements for controlling the driving of the movers; and
   a position sensor configured for sensing position information corresponding to the true absolute position of the movers along the path;
   wherein the sensor is associated with the controller for transmitting the position information to the controller, the sensor being configured such that position formation is transmitted from the movers through substantially the entire sensor at a sensing speed faster than about 10,000 meters per second, and the controller is configured for controlling the movement of at least one of the movers independently from the others.

2. The system of claim 1, wherein the sensor comprises a transducer configured for transducing the position information from the movers from a first form to a second form that is readable by the controller, wherein the position information is transmitted in the first form at at least the sensing speed from the movers to the transducer, and in the second form to the controller.

3. The system of claim 2, wherein the position information in the first form comprises an electromagnetic field, and in the second form comprises an electrical signal.

4. The system of claim 1, wherein the movers comprise a sensor activation element that transmits the position information to the sensor, the activation element is a passive element.

5. The system of claim 1, wherein the movers comprise passive elements.

6. The system of claim 1, wherein the controller is configured for controlling the active element depending on at least one parameter based on the position information received from the sensor.

7. The system of claim 1, wherein the sensing speed is more than about 25,000 meters per second.

8. The system of claim 1, wherein the sensing speed is about the speed of electrons.

9. The system of claim 1, wherein the sensor comprises at least one magnetoresistive sensor.

10. The system of claim 1, wherein the sensor is configured for detecting an angle to the movers.

11. The system of claim 1, wherein:
    the active elements comprise a plurality of active elements; and
    the reactive elements are mounted to the movers;
    the controller is configured for activating the active elements that are in operational proximity to the reactive elements so that the motion of at least one of the movers is controlled independently from the others.

12. The system of claim 1, wherein the sensor comprises a plurality of sensors disposed along the path.

13. The system of claim 1, further comprising a linear motor that comprises the active and reactive elements.

14. The system of claim 1, wherein the sensor and controller are configured for ascertaining the position of the movers substantially without any movement of the movers.

15. A machine for conducting an automated operation, comprising the system of claim 1, which further comprises a tool mounted on the mover and configured for performing an operation on a workpiece.

16. A controlled motion system, comprising:
    a track;
    a plurality of movers movably mounted on the track for moving along a path;
    active and reactive elements associated with the movers and track and configured for driving and controlling the position of the movers along the path;
    a controller operably associated with the active elements for controlling the driving of the movers;
    a position sensor associated with the track and configured for sensing position information corresponding to the position of the movers along the path;
    wherein the controller is configured for calculating parameters corresponding to the position and motion of the movers using a seventh order polynomial and controlling the active element depending on the calculated parameters.

17. The system of claim 16, wherein the controller is configured for recalculating said parameters upon occurrence of an event that requires adjustment of the trajectory of the mover.

18. The system of claim 16, further comprising a linear motor that comprises the active and reactive elements.

19. The system of claim 18, wherein the mover comprises a plurality of movers, and the controller is configured for controlling the motion of at least one of the movers independently from the others.

20. A controlled motion system, comprising a motor assembly that comprises:
a mover comprising a mover bearing portion;
a track bearing portion associated with the mover bearing portion for guiding the mover along a path;
a driving element configured for driving and controlling the position of the mover along the path;
a controller operably associated with the driving element for controlling the driving of the mover; and
a control parameter sensor configured for sensing control parameter information corresponding to the mover along the path and transmitting sensing control parameter information to the controller;
wherein the track bearing portion and the driving element are assembled together on a single track that extends along at least a portion of the path;
wherein the mover defines an interior passage in which the single track is received longitudinally with respect to the path; and
wherein the driving element comprises an active element that is drivingly associable with a reactive element of the mover for driving and controlling the position of the mover along the path.

21. The system of claim 20, wherein the bearing portions are configured for keeping the mover on the track in substantially any orientation.

22. The system of claim 20, wherein the track bearing portion comprises only two rails extending along the path.

23. The system of claim 20, wherein the single track extends along substantially the entire path.

24. The system of claim 20, wherein the position sensor is mounted to the single track.

25. The system of claim 20, wherein the track comprises a plurality of track modules connected sequentially along the path.

26. The system of claim 25, wherein:
the mover comprises a plurality of movers, each comprising a reactive element;
the driving element comprises a plurality of module active elements drivingly associable with the reactive element for driving and controlling the position of each mover along the path;
the controller comprises a plurality of module controllers associated with the module active elements for controlling the driving of the mover;
the control parameter sensor comprises module true absolute position sensors configured for sensing the position of each mover along the path and transmitting position information on the position of each mover to the module controller; and
each module comprises at least one of each of the module active elements, module controllers, and module position sensors.

27. The system of claim 20, wherein the single track is substantially free of portions that extend parallel to the bearing portions spaced therefrom in a lateral direction with respect to the path.

28. The system of claim 20, wherein the single track is configured for draining flowable material therefrom for maintaining sanitary conditions.

29. A controlled motion system, comprising:
a plurality of movers, each comprising a mover bearing portion;
active and reactive elements associated with the movers and track and configured for driving and controlling the position of each mover along the path;
a plurality of track modules assembled as a track, each module comprising:
the active elements, and
a track bearing portion associated with the mover bearing portions for guiding each mover along a path;
a controller operably associated with the driving element for controlling the driving of each mover; and
a position sensor associated with the track and configured for sensing the true absolute position of each mover along the path and transmitting position information on the position of each mover to the controller.

30. The system of claim 29, wherein the position sensor comprises module position sensors confirgured for sensing the position of the mover along the path and transmitting position information on the position of the mover to the controller, and each module comprises at least one of the module position sensors.

31. The system of claim 30, wherein the controller comprises a plurality of module controllers associated with the active elements for controlling the driving of the mover, the module sensors being configured for transmitting the position information to the module controllers, and each module comprises at least one of the module controllers.

32. The system of claim 31, further comprising a system controller operably associated with the module controllers for controlling the operation thereof.

33. A controlled motion system, comprising a motor assembly that comprises:
a track;
a plurality of movers movably mounted on the track for moving along a path;
active and reactive elements associated with the track and movers, respectively, and configured for driving and controlling the position of the movers along the path; and
a controller operably associated with the active elements for controlling the driving of the movers;
wherein the controller is configured for controlling at least one of the movers independently from the others, and the track is configured for draining flowable material therefrom for maintaining sanitary conditions.

34. The system of claim 33, wherein the mover is configured for draining flowable material therefrom for maintaining sanitary conditions.

35. The system of claim 33, further comprising a cover associated with the track and configured for enclosing the active elements for preventing collection of the flowable material.

36. The system of claim 33, wherein substantially any concave portions of the track and portions of the system mounted thereto have drain features configured for draining flowable material therefrom.

37. The system of claim 33, wherein the track comprises an upwardly facing concave portion and a drain channel in connection therewith for draining the flowable material from the concave portion.

38. The system of claim 33, further comprising a control parameter sensor configured for sensing control parameter information corresponding to at least one of the movers, wherein the sensor is associated with the controller for transmitting the control parameter information to the controller, and the controller being configured for controlling at least one active element depending on the control parameter information.

39. A controlled motion system, comprising:

a track;

a plurality of movers movably mounted on the track for moving along a path;

active and reactive elements associated with the tracks and movers and configured for driving and controlling the position of the mover along the path;

a controller operably associated with the active elements for controlling the driving of the mover; and a position sensor associated with the track and configured for sensing position information corresponding to the position of the mover along the path wherein the sensor is associated with the controller for transmitting the position information to the controller;

wherein the controller is configured for controlling the active element depending on at least one parameter relating to the position information and for assigning a soft identifier to at least one of the movers that is reassignable to other movers.

40. The system of claim 39, wherein the soft identifier is assigned to at least one of the movers depending on the position thereof at a selected time.

41. A method of controlling motion in a system, comprising:

determining the true absolute position along a path of a plurality of movers of a linear motor by transmitting position information from the movers to a sensor substantially along the path at a sensing speed of at least about 10,000 meters per second; and driving and controlling the position of at least one of the movers independently from the others.

* * * * *